(12) United States Patent
Anstey et al.

(10) Patent No.: US 9,841,052 B2
(45) Date of Patent: Dec. 12, 2017

(54) SHAFT AND BEARING ASSEMBLIES WITH REDUCED MOMENTS

(71) Applicant: Deere & Company, Moline, IL (US)

(72) Inventors: Henry D. Anstey, Ottumwa, IA (US); Roger W. Frimml, Ottumwa, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/821,345

(22) Filed: Aug. 7, 2015

(65) Prior Publication Data

US 2017/0037897 A1 Feb. 9, 2017

(51) Int. Cl.

| | |
|---|---|
| F16C 23/04 | (2006.01) |
| F16C 23/08 | (2006.01) |
| F16C 35/063 | (2006.01) |
| F16C 33/58 | (2006.01) |
| F16C 19/06 | (2006.01) |

(52) U.S. Cl.
CPC ............ *F16C 23/088* (2013.01); *F16C 23/08* (2013.01); *F16C 33/581* (2013.01); *F16C 33/586* (2013.01); *F16C 35/0635* (2013.01); *F16C 19/06* (2013.01)

(58) Field of Classification Search
CPC ...... F16C 23/08; F16C 23/082; F16C 23/088; F16C 33/581; F16C 33/586; F16C 35/0635
USPC ......... 464/106, 153, 155, 158, 159; 403/383
See application file for complete search history.

(56) References Cited

U.S. PATENT DOCUMENTS

| | | | | |
|---|---|---|---|---|
| 5,069,569 | A | * 12/1991 | Lieser | F16D 3/20 403/229 |
| 5,178,472 | A | 1/1993 | Lawson | |
| 5,738,586 | A | * 4/1998 | Arriaga | B25B 13/06 464/106 |
| 6,709,234 | B2 | * 3/2004 | Gilbert | F04D 7/065 403/305 |
| 7,175,711 | B2 | * 2/2007 | Platzer | F16C 33/043 118/419 |

(Continued)

FOREIGN PATENT DOCUMENTS

| | | | |
|---|---|---|---|
| DE | 19706686 | * | 8/1998 |
| DE | 202010015245 U1 | | 1/2011 |

(Continued)

OTHER PUBLICATIONS

European Search Report for Application No. EP16181758 dated Jan. 4, 2017.

(Continued)

*Primary Examiner* — James Pilkington
(74) *Attorney, Agent, or Firm* — Lorenz & Kopf, LLP

(57) ABSTRACT

An assembly is described for reducing the moment from a deflected shaft. A shaft includes a shaft body and an outer shaft surface. A bearing includes an inner race engaging the shaft, the inner race including an inner race surface and a race body with axial edges. When the shaft body or a portion of the bearing is deflected from a nominal axis of relative rotation, the shaft body applies a force to the bearing at an axially outermost location that is axially inward from at least one of the axial edges of the race body. Accordingly, an effective line of action of the force is applied at a location that is axially removed from the at least one of the axial edges of the race body towards a central plane of the bearing.

12 Claims, 19 Drawing Sheets

(56) References Cited

U.S. PATENT DOCUMENTS 8,366,339 B2 * 2/2013 Lin .................... F16C 11/0604
  403/57
8,500,336 B2 * 8/2013 Kouscheschi ....... F16C 33/6692
  384/418

FOREIGN PATENT DOCUMENTS

DE   102010052101 A1   5/2012
JP       2008203668 A   9/2008

OTHER PUBLICATIONS

Deere & Company, Electric Surface Wrap Actuator Control and Linkage, Parts Manual, 457 and 557 Round Balers, Pin Fastener, pp. 80-2 and 80-3 with isometric view of pin fastener, Jun. 27, 2003.
Blue Ribbon Service, 241 and 2400 Big Roll Balers, Service Manual, GSS-1459-1 W/Revision 3, Jan. 1979, International Harvester North American Operations Agricultural Equipment Group, Chicago, Illinois, United States of America.

* cited by examiner

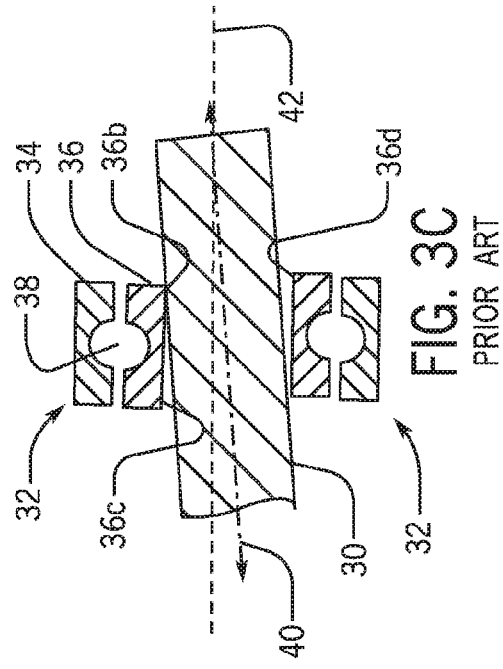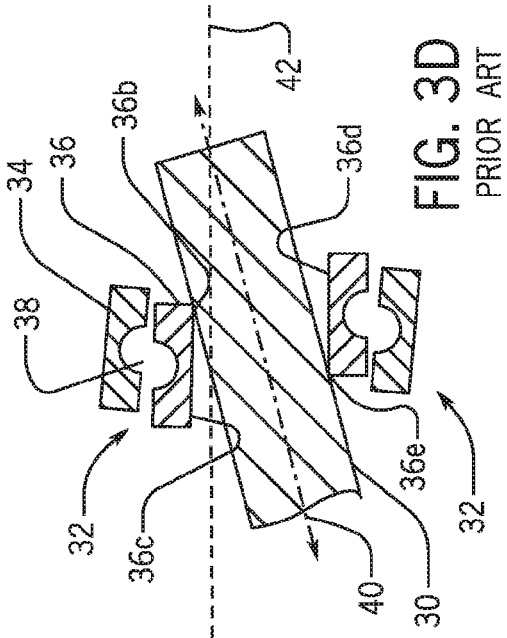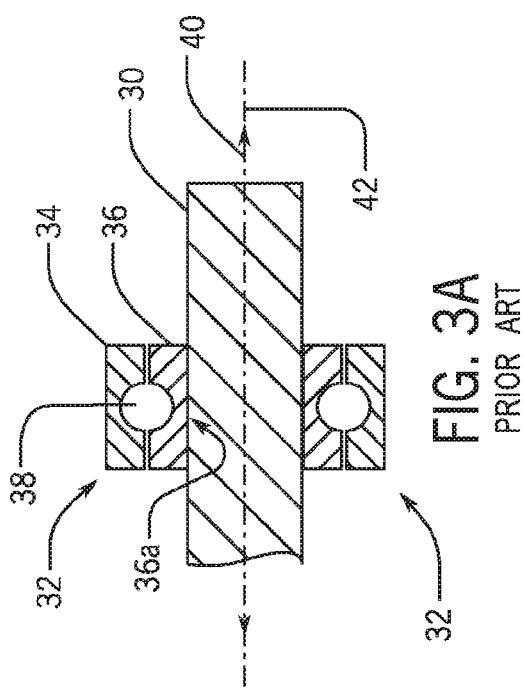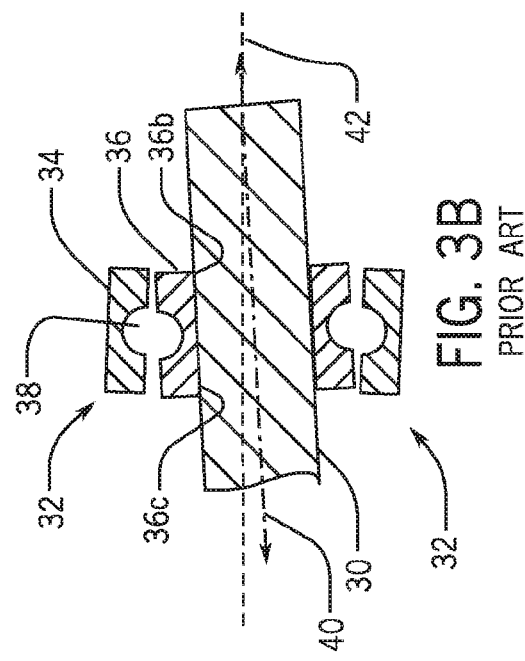
FIG. 3A PRIOR ART
FIG. 3B PRIOR ART
FIG. 3C PRIOR ART
FIG. 3D PRIOR ART

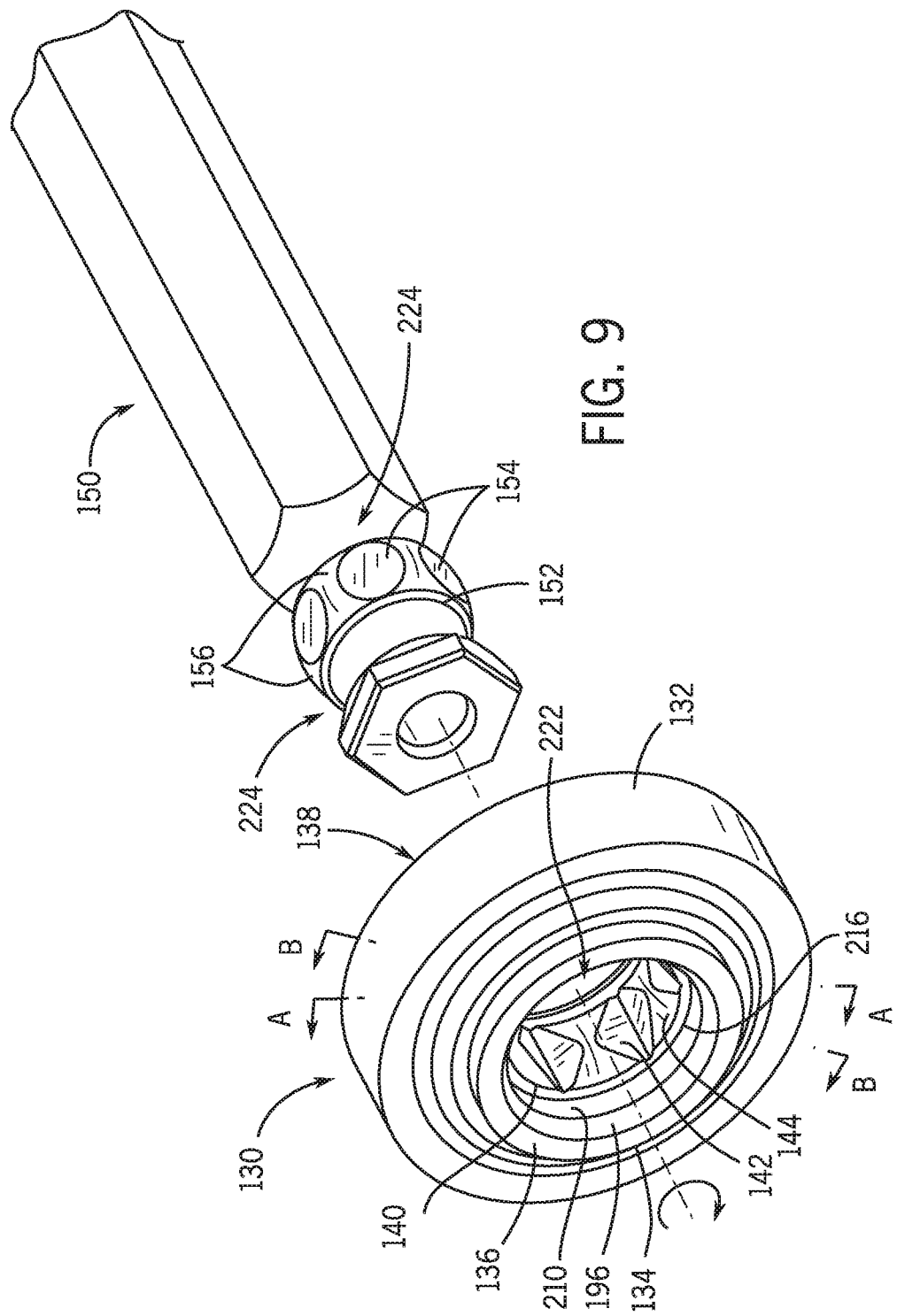

SHAFT AND BEARING ASSEMBLIES WITH REDUCED MOMENTS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to support of rotating members, including shafts and bearings supporting rotating rollers within round balers.

BACKGROUND OF THE DISCLOSURE

In various agricultural and other settings, rotating machinery may be utilized. For example, rotating components may be utilized in round (or other) balers for gathering cut material from a field, forming cylindrical (or other) bales of the material within a baling chamber, and wrapping the formed bales with various types of wrap material. In certain implementations, various rollers or other devices may rotate in order to form the material into the bales within the baling chamber. In certain implementations, additional rollers or other devices may then rotate to wrap the finished bales with various materials before the bales are ejected from the baling chamber. These and other rotating components may often be supported by bearings (e.g., ball bearings, roller bearings, and so on).

Optimal bearing function and lifespan may be obtained when radial forces on the bearing generally align with the axial center of the bearing. For example, a bearing supported by (or supporting) a relatively rotating shaft may optimally perform when forces from the shaft generally align with a diametric line extending through the balls of a ball bearing. In various applications, however, uneven loading or other forces may tend to cause relatively rotating components (e.g., shafts, rollers, and so on) to deviate from a nominal axis of rotation. This deviation may result in the misalignment of forces on the supported (or supporting) bearing and, accordingly, the application of a moment to the bearings. Such a moment, for example, may cause misalignment of bearing components (e.g., bearing races), resulting in suboptimal bearing function, excessive bearing wear, uneven seal wear, and even premature bearing failure. Further, with typical bearing designs, as a shaft (or other relatively rotating component) supporting (or supported by) a bearing deviates from its nominal alignment (e.g., due to an uneven loading or other deflection), the shaft may impose a relatively large force at (or near) the axial edge of the bearing, which may result in the imposition of a particularly large moment on the bearing. This may correspond to particularly detrimental effects on bearing performance, integrity, and lifespan.

SUMMARY OF THE DISCLOSURE

An assembly is disclosed for reducing the moment applied to a bearing by a deflected rotating component.

According to one aspect of the disclosure, a non-circular shaft includes a shaft body and an outer shaft surface. A bearing includes an inner race engaging the shaft, the inner race including an inner race surface and a race body with first and second axial edges. The race body defines a non-circular bore. When the shaft body or a portion of the bearing is deflected from a nominal axis of relative rotation, the shaft body applies a force to the bearing at an axially outermost location that is axially inward from at least one of the first and second axial edges of the race body. Accordingly, an effective line of action of the force is applied at a location that is axially removed from the at least one of the first and second axial edges of the race body towards a central plane of the bearing.

In certain embodiments, the outer shaft surface or the inner race surface includes an interior portion, and an exterior portion disposed axially between the interior portion and one of the axial edges. The bearing and the shaft engage for relative co-rotation via the interior portion contacting the inner race or outer shaft surface, respectively, with the inner race and outer shaft surfaces being spaced apart from each other along the exterior portion. A force from the shaft, when deflected, is applied axially inward from one of the axial edges of the inner race.

In certain embodiments, the first interior portion may define a first radial extension away from the shaft body or the race body. The first interior portion may further define a second radial extension away from the shaft body or the race body. The second radial extension may be radially smaller than the first radial extension and disposed axially between the first radial extension and one of the first and second axial edges of the race body.

In certain embodiments, the interior portion of the shaft or race surface may be stepped, may be crowned, may include various recesses, or may include various flat regions. The interior portion or exterior portion may be included on a removable insert or sleeve configured to engage, respectively, the inner race or the shaft.

According to another aspect of the disclosure a non-circular shaft has a shaft body, an outer shaft surface and a nominal axis of rotation. A bearing has an inner race with a race body that includes an inner race surface and defines a non-circular bore. An engagement portion of the inner race surface or outer shaft surface has an axially outermost edge that is axially inward from axial edges of the race body. A separation portion of the inner race surface or outer shaft surface is axially interleaved with the engagement portion. The bearing and shaft engage for relative co-rotation via the inner race surface or the outer shaft surface contacting the engagement portion, while being spaced apart from the separation portion. A force from the shaft, when the shaft or a portion of the bearing is deflected from the nominal axis of rotation, is accordingly applied axially inward from the axial edges of the race body.

In certain embodiments, the engagement portion may include a plurality of recesses and the separation portion includes a plurality of raised regions. The recesses may include v-profile indents. The raised regions may include crowned portions bounded by the recesses.

According to yet another aspect of the disclosure, a shaft includes a shaft body and an outer shaft surface. First and second bearings include a first and second inner races engaging the shaft for relative co-rotation around a nominal axis of relative rotation. The inner races include, respectively, first and second race bodies with first and second inner race surfaces having first and second engagement portions. In order to provide relative co-rotation of shaft and the first and second inner races, respectively, the first and second inner race surfaces engage the outer shaft surface along the first and second engagement portions, at locations that are axially inward from axially exterior edges of the respective race bodies.

In certain embodiments, the first and second engagement portions may include first and second pluralities of recesses, respectively. In order to provide the relative co-rotation with the first and second inner races, the shaft may engage the first and second pluralities of recesses at axially outermost locations that are axially inward of the axially exterior edges of the respective race bodies.

The details of one or more embodiments are set forth in the accompanying drawings and the description below. Other features and advantages will become apparent from the description, the drawings, and the claims.

BRIEF DESCRIPTION OF THE DRAWINGS

FIGS. 3A-3D are schematic cross-sectional views of a traditional shaft and bearing assembly at various degrees of deviation from a nominal axis of rotation;

FIG. 9 is an exploded perspective view of a shaft and bearing assembly according to the present disclosure, including a shaft and a bearing;

Like reference symbols in the various drawings indicate like elements.

DETAILED DESCRIPTION

Figure 1:
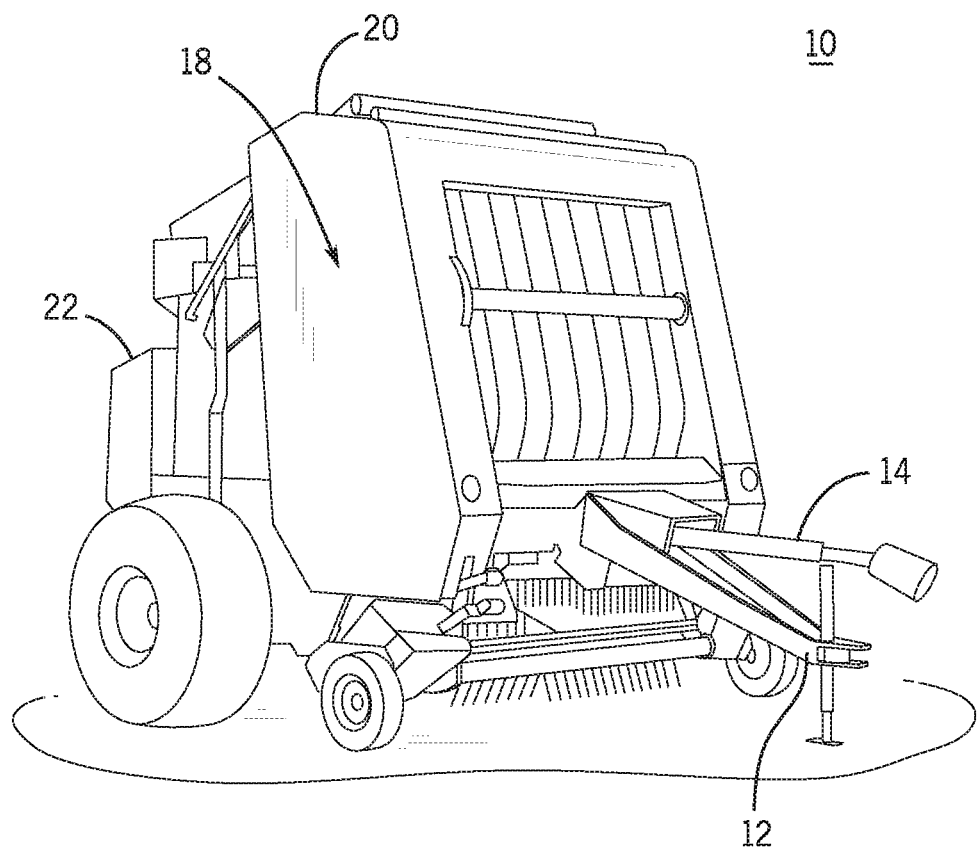
FIG. 1 is a perspective view of an example baler configured for towing by an agricultural work vehicle.

The following describes one or more example embodiments of the disclosed assembly (or assemblies), as shown in the accompanying figures of the drawings described briefly above. Various examples herein may refer to assemblies in the context of a round baler for cut plant material and, in particular, to bearings and shafts for rotation of rollers within such a baler. It will be understood, however, that the disclosed assemblies may be utilized in a variety of settings, with respect to a variety of machinery, and for a variety of rotating components. Various modifications to the example embodiments may be contemplated by one of skill in the art.

Typically, a bearing supported by (or for support of) a shaft (or other relatively rotating component) includes an inner race and an outer race separated by one or more bearing members, with the bearing members facilitating relative rotation of the inner and outer races. For example, a ball bearing may include a generally annular inner race separated from a generally annular outer race by a plurality of bearing balls, which allow the inner and outer race to rotate independently of each other. The inner race may also include an inner surface that engages an outer surface of the associated shaft (or other rotating component) along engagement portions of the inner and outer surfaces. When a bearing and a supported shaft are properly aligned, a nominal axis of relative rotation of the shaft may generally align with a nominal axis of relative rotation of the inner race.

It will be understood that "relative rotation" may involve the rotation of one component from the perspective of another component, without necessarily requiring a particular one of the components to rotate in an absolute sense. For example, relative rotation of the inner and outer races of a bearing may include the inner race remaining generally stationary as the outer race rotates, the outer race remaining generally stationary as the inner race rotates, or both of the inner race and the outer race rotating at different rates. Likewise, "relative co-rotation" of two bodies will be understood to mean that the two bodies execute the same "relative rotation" with respect to a reference. For example, where an inner race and a supporting (or supported) shaft are engaged in relative co-rotation, both the inner race and the shaft may rotate at the same relative rate with respect to the rotation (or non-rotation) of an associated outer race. For example, where an inner race and a supporting shaft are engaged in relative co-rotation, the shaft and inner race may be stationary while an associated outer race rotates around them, or the shaft and inner race may co-rotate while the associated outer race remains stationary.

As used herein, a "non-circular" bore or shaft may refer to a shaft or bore (e.g., of a bearing) that exhibits a generally non-circular cross-sectional profile as viewed along a plane perpendicular to a relevant axis of rotation or line of rotational symmetry. For example, a bore or shaft with a hexagonal, square or other polygonal cross-sectional profile may be viewed as a non-circular bore or shaft. Similarly, a bore or shaft with a generally circular cross-sectional profile that is interrupted by one or more flats, recesses, cut-outs, and so on, may also be viewed as a non-circular bore or shaft.

Also as used herein, a "slope transition location" may be viewed as a point (or region of points) at which a profile changes concavity (e.g., an inflection point of a curved or angled profile) or a point (or region of points) at which a profile changes slope in a relatively non-continuous manner (e.g., at a corner or cusp). As used herein, a "slope transition location" may include both angled (e.g., square) and rounded corners or cusps.

As noted above, deflection of a shaft supporting (or supported by) a bearing may tend to impose a force on the bearing and the shaft that creates an undesirable moment for the bearing. For example, when not deflected (e.g., when evenly loaded) a shaft may tend to impose a force on the bearing that is generally axially centered on the bearing and, as such, generally extends radially through the central portion of the bearing (e.g., through the various bearing balls of a ball bearing). However, when a shaft is deflected away from its nominal axis of relative rotation, the shaft may impose a force on the bearing at a location that is closer to the axial edges of the bearing. This may result in the undesired application of a moment on the bearing and the shaft, which may stress the shaft, misalign the bearing races, decrease bearing performance, increase wear on the bearing, and even decrease the bearing's lifespan. Notably, the magnitude of such a moment and, accordingly, the magnitude of its detrimental effect, is increased when the force is applied at a greater distance from a pivot point (i.e., applied with a greater lever arm). Accordingly, a configuration of a bearing and a shaft for which a deflection of the shaft applies force on the bearing at or near the bearing's axial edge(s) (i.e., with a maximal lever arm, with respect to the bearing) may result in particularly large moments and particularly detrimental effects on the bearing and the shaft. In some known configurations, this problem may be exacerbated by the general tendency to provide relatively wide inner races, including as compared to the corresponding outer races, in order to accommodate multi-lip seals, locking collars, or other arrangements.

In this light, it may be useful to provide a configuration for either the inner race of a bearing or the associated shaft that may reduce the moment imposed on the bearing (and possibly the shaft) by a deflection from a nominal axis of rotation. Various discussion herein may relate to actual deflection of a shaft, when the shaft is supported by a bearing, such that the shaft itself deviates from a nominal axis of rotation of the shaft and the bearing. It will be understood, however, that undesirable moments may result from other deflections. For example, in some configurations, a shaft may be rotationally fixed, such that the shaft and an inner race of a bearing mounted to the shaft do not rotate, but an outer race of the bearing may rotate relative to the shaft and inner race. In such configurations, deflection of the outer race with respect to the inner race (and the nominal axis of rotation of the bearing/shaft arrangement) may result in a similarly detrimental offset application of force between the shaft and the inner race (and between the bearing races). Unless otherwise specified, discussion below relating to actual deflection of the shaft may also apply to deflection of an outer race of a bearing, relative to a shaft and inner race of the bearing, as well as other similar deflections.

Generally, embodiments contemplated in this disclosure may include features or geometries that result in a deflected shaft (or other relative deflection) applying a force to a bearing along an effective line of action that is axially inward from the axially outer edges of the bearing. As discussed in detail herein, such configurations may result in relatively smaller moments on the bearing than would otherwise obtain. In different embodiments, this axially inward relocation of the effective line of action (e.g., via an axially inward relocation of an axially outermost contact point between a shaft and an inner race of a bearing) may be achieved in various ways, including via steps, crowns, chamfers, and so on. An effective line of action may be substantially axially inward from the axially outer edges of the bearing (e.g., relevant inner race) more than through conventional manufacturing techniques, such as conventional chamfering or rounding of corners of bearing races, which may not provide sufficient relocation of the effective line of action. For example, it may be useful to configure the disclosed features such that such an effective line of action (e.g., as may result from a relative deflection for a bearing assembly such as a deflection of a shaft relative to an inner race of a bearing) intersects the bearing at an axially outermost location that is 5% or more (at least 5%) of the total width of the relevant bearing feature (e.g., the relevant inner race), as measured from an axially outer edge of the bearing.

In certain embodiments, it may be useful to provide an outer surface on a shaft or an inner surface on an inner race that includes an interior region and one or more exterior regions (from an axial perspective), with the interior region being separated from the axial edges of the inner race by the exterior regions and exhibiting, at least in part, a different radial dimension than the exterior regions. For example, an interior region of an inner surface of an inner race may define a smaller characteristic bore diameter than an exterior region of the inner surface, or an interior region of a shaft's outer surface may include a larger characteristic diameter than an exterior region of the outer surface. Under such a configuration, with the shaft engaging the inner race along the interior region, deflection of the shaft may still result in the application of force to the bearing away from the axial center of the bearing. Due to the difference in radial dimensions of the interior and exterior regions, however, such force may be applied mainly along the interior region, rather than along the exterior region. Further, because the interior region may be separated from an axial edge of the bearing by at least the exterior region, this force may be applied with a smaller lever arm than if it were applied at (or near) the bearing's axial edge and, accordingly, may result in a generally smaller moment on the bearing and the shaft. The noted interior and exterior regions may be configured in a variety of ways, may include portions that overlap axially, and may cover all or only a portion of a relevant circumference of the associated shaft or inner race.

In certain embodiments, a stepped profile may be utilized. For example, the inner surface of an inner race of a bearing may include a central stepped portion that exhibits a generally larger radial extension away from the body of the race than portions of the inner surface that are closer to the axial edges of the race. When a shaft engaged with such a stepped portion is deflected, the shaft may accordingly apply a moment to the bearing at the edge of the stepped portion, rather than at the axial edge of the inner race, which may result in relatively smaller stresses on the inner and outer races (and possibly on the shaft itself). Alternatively (or additionally) a stepped portion may be included on a shaft body, with the stepped portion generally aligning with the axial center of a bearing and ending short of the axial edges of the bearing. As above, when such a shaft is deflected, the shaft may apply a moment to the bearing at the edge of the stepped portion, rather than at the axial edge of the inner race.

In certain embodiments, a crowned profile may be utilized. For example, the inner surface of an inner race of a bearing may include a central crowned portion ("crown") that exhibits a generally larger radial extension away from the body of the race at the center of the crown than at portions near the axial edges of crown (and the axial edges of the bearing). When a shaft engaged with this crowned portion is deflected, the shaft may accordingly apply a force to the bearing along the crown, rather than at the axial edge of the inner race, which may result in relatively smaller stresses on the inner and outer races (and possibly on the shaft itself). Alternatively (or additionally) a crowned portion may be included on a shaft body, with a maximal extension of the crowned portion generally aligning with the axial center of a bearing. As above, when such a shaft is deflected, the shaft may apply a moment to the bearing along the crown, rather than at the axial edge of the inner race.

In certain embodiments, a combination of stepped and crowned profiles may be included. For example, either or both of a shaft or an inner race of an associated bearing may include a stepped and crowned profile, such that deflection of the shaft tends to apply a moment to the bearing at a location that is axially inward from the bearings outer axial edges. In this way, the moment applied to the bearing for a given deflection of the shaft may be generally reduced (e.g., versus a similar force applied at a bearing edge), resulting in less stress on the bearing (and possibly on the shaft).

In certain embodiments, various other geometries may be utilized. For example, an inner surface of an inner race or an outer shaft surface may include various flat regions interspersed with crowned or other (e.g., cornered) regions, various recesses interspersed with crowned or other (e.g., flat) geometries, and so on. In certain embodiments, various of these features may be in contact with each other in order to provide appropriate engagement of the inner race and the shaft. For example, flat regions on a stepped and crowned shaft profile may engage with stepped and crowned regions on an inner race (or vise versa) and recessed regions on an inner race may engage with stepped and crowned (or cornered) regions on a shaft (or vise versa).

Referring now to FIGS. 1 and 2, a bearing assembly (or assemblies) may be implemented with respect to round baler 10 (or with respect to a variety of other machines with rotating components). Baler 10 may include tongue 12 so that baler 10 may be towed during operation by a separate vehicle (e.g., an agricultural work vehicle such as a tractor (not shown)). Baler 10, in certain embodiments, may receive power from such a vehicle via PTO connection 14, which may be connected in various known ways to a PTO shaft of the vehicle. As baler 10 moves (e.g., is towed) across a field, cut crop material may be gathered by an intake assembly and guided into baling chamber 18 within frame 20.

Figure 2A:
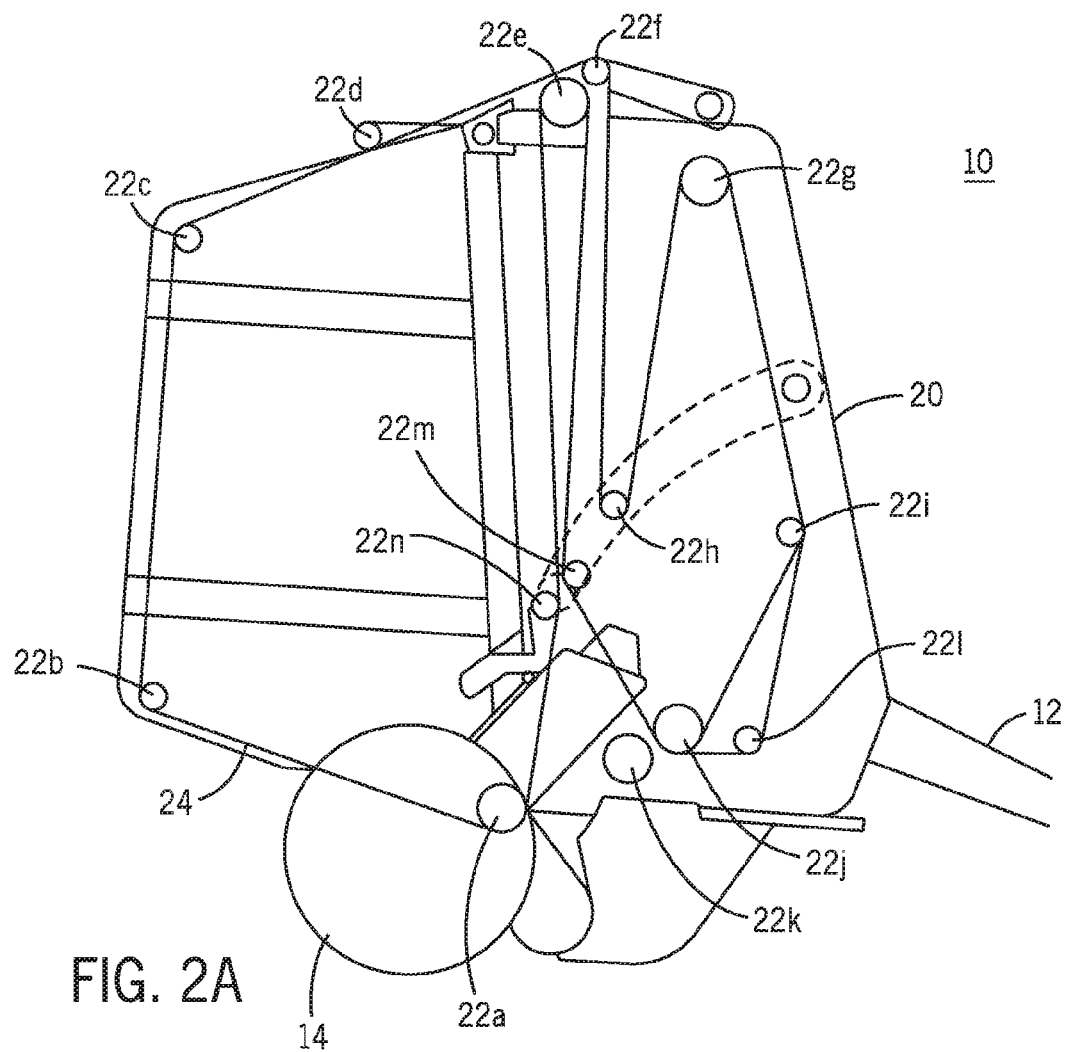
FIG. 2A is a schematic side view of certain components of the baler of FIG. 1.

Referring in particular to FIG. 2A, various rollers 22 (shown at 22a-22n) may be mounted within baling chamber 18, and may be generally supported for rotation by cylindrical (or other) shafts or rollers and various associated bearings (not shown in FIG. 2A). Accordingly, rollers 22 may generally support or drive movement of belts 24 for the rotation and compression of the gather crop material into generally cylindrical bales (not shown). Once the bale has reached an appropriate size, the bale may be ejected from baler 10 through a discharge gate.

Figure 2B:
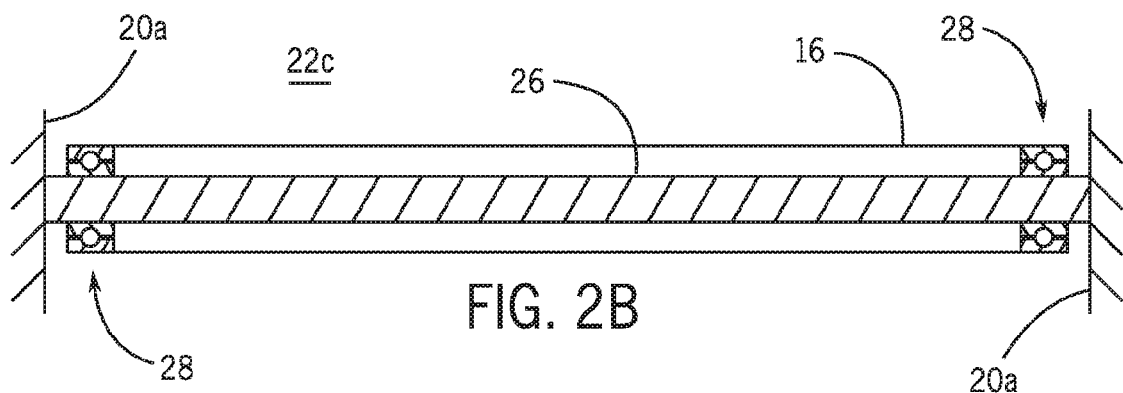
FIG. 2B is a schematic cross-sectional view of a roller and bearing assembly for the baler of FIG. 1.

Rollers 22, or other rotating bodies contemplated herein, may be configured in various ways. As depicted in FIG. 2B, various of rollers 22 (e.g., roller 22c) may be configured with shaft 26 fixed to walls 20a of baler 10. Respective inner races of two bearings 28 may engage either end of shaft 26, with outer races of the bearings engaging cylindrical roller 16 that generally surrounds shaft 26. In this way, for example, roller 16 and outer races of bearings 28, may rotate with respect to shaft 26 and the inner races of bearings 28, during operation of baler 10.

As with other shaft and bearing arrangements, various modes of deflection may be possible for the arrangement depicted in FIG. 2B. In some cases, for example, deflection of walls 20a may cause shaft 26 itself to deviate from a nominal axis of rotation of roller 22c. This, in turn, may cause a relative deflection of the inner races of bearings 28, with respect to the respective outer races (and, possibly, with respect to the shaft 26). In some cases, roller 16 may itself be deflected with respect to shaft 26 (e.g., under loading from belts 24 or a bale being formed in chamber 18). This may also cause relative deflection or misalignment of the outer races with respect to the respective inner races (and, possibly, deflection of the inner races with respect to shaft 26).

Referring also to the diametric sectional views of FIGS. 3A-3D, shaft 30 may be a shaft supporting one of rollers 22 in baler 10, or may be a shaft associated with various other types of rotating machinery. Bearing 32, which may include outer race 34 and inner race 36, may be generally supported for relative rotation by shaft 30 (or may generally support shaft 30 for relative rotation). Bearing 32 may be configured as any variety of bearing types, including, as depicted in FIGS. 3A-3D, as a ball bearing with annular groove 38 providing a seat for various bearing balls (not shown). These balls may rotate within groove 38 in order to support the relative rotation of inner race 36 with respect to outer race 34. This in turn may allow the relative co-rotation of shaft 30 and inner race 36 around axis of rotation 40. In certain embodiments, during operation of the baler 10, the shaft 30 and inner race 36 may be rotationally stationary, from an outside perspective, while the outer race 34 rotates, from an outside perspective, around the shaft 30 and inner race 36 (and the associated relative axis of rotation). For example, the outer race 34 may rotate relative to the inner race 36 and the shaft 30 in order to facilitate rotation of a roller supported by the outer race 34.

When axis of rotation 40 is generally aligned with nominal reference line 42 (see FIG. 3A), an even load on shaft 30 may result in shaft 30 applying a relatively even or axially centered force to inner surface 36a of inner race 36. Accordingly, shaft 30 may apply little to no moment to bearing 32. For example, where shaft 30 supports one of rollers 22 in baler 10, shaft 30 may impose relatively little moment on bearing 32 when the supported roller 22 is aligned with a horizontal reference. However, deflection of the shaft 30 from alignment with nominal reference line 42 (e.g., via uneven loading, transient system effects, dissimilar stiffness of different components, or other phenomenon) may result in shaft 30 applying a relatively uneven or off-centered load to bearing 32. For example, referring to FIG. 3B, as shaft 30 is deflected downward away from reference line 42, shaft 30 may impart a larger contact force at point 36b at the right-side axial edge of bearing 32 (from the perspective of FIGS. 3A-3D) than at point 36c at the left-side axial edge of bearing 32. Accordingly, shaft 30 may impose a moment on bearing 32 which may tend to urge races 34 and 36 out of alignment and impose undesirable stresses on the bearing 32.

As shaft 30 further deviates from reference line 42 (e.g., as depicted in FIGS. 3C and 3D), this moment may increase, with a potential corresponding increase in the stress on the shaft 30 (e.g., via the contact at point 36e in FIG. 3D) and in the stress on and misalignment of races 34 and 36. Moreover, sufficient deviation of shaft 30 from reference line 42 may result in shaft 30 separating from inner race 36 at points 36c and 36d, which may result in shaft 30 applying an even larger moment to inner race 36 at point 36b. This application of a moment to bearing 32 by shaft 30 may be generally undesirable, as it may lead to significant increase in stress and possible wear on the shaft 30 and the bearing 32 and, correspondingly, to significant decrease in the effectiveness and lifespan of the bearing 32 and possibly the shaft 30.

The potential for misalignment of races 34 and 36, and the corresponding resultant moment, may be increased in configurations (not shown) where inner race 36 is wider than outer race 36. Such configurations, as also noted above, may be useful when using a multi-lip seal against inner race 34, in order to protect the interior components of bearing 32, for including a locking collar, or for other configurations. With a wider inner race 34, however, force applied to the inner race 34 by shaft 30 during deflection of shaft 30 (or as a result of other deflections) may tend to act along an effective line of action that is even further removed from the central (e.g., ball) plane of bearing 32. Accordingly, in such configurations, a relatively greater moment may be experienced by bearing 32.

As noted above, in order to reduce the moment applied to a bearing by a shaft, the inner surface of an inner race or the outer surface of a shaft may be designed to include various contours. Generally, for example, it may be useful to provide an inner race or shaft with an interior portion (e.g., an axially central portion generally aligned with the bearing members (e.g., balls) of the bearing) that extends farther away from the race or shaft than does an exterior portion that is between the interior portion and an axial edge of the bearing. In this way, the shaft and bearing surfaces may engage each other via contact along the interior portion, while the shaft and bearing surfaces remain spaced apart along the exterior portion.

Figure 4A:
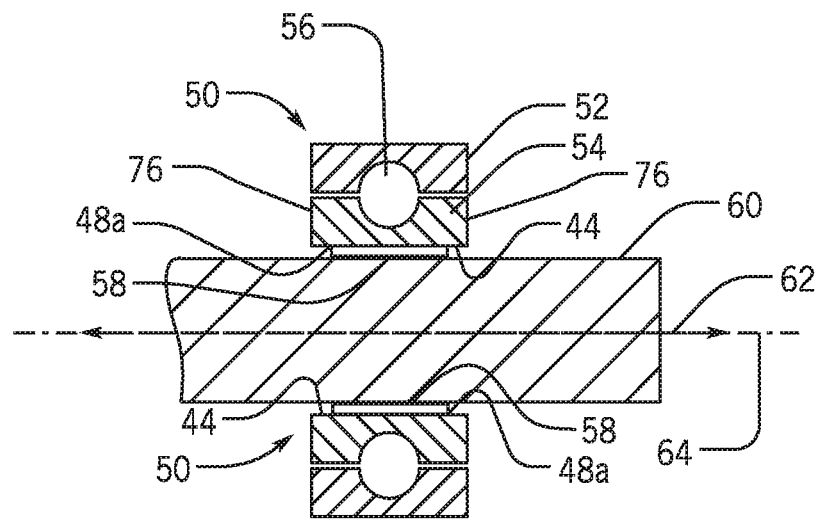
FIGS. 4A and 4B are schematic cross-sectional views of example shaft and bearing assemblies according to the present disclosure.

Referring to FIG. 4A, for example, bearing 50 may include outer race 52 and inner race 54 separated by groove 56, within which various bearing balls (or other bearing members) (not shown) may be seated. Inner race 54 may generally engage an outer surface of shaft 60 to enable relative co-rotation of shaft 60 and inner race 54 and the relative rotation of shaft 60 (and inner race 54) around relative axis of rotation 62 (e.g., as embodied by shaft 60 and inner race 54 remaining stationary while outer race 52 rotates around relative axis of rotation 62, or vice versa). Shaft 60 may be a shaft supporting one of rollers 22 in baler 10, or may be a relatively rotating shaft associated with various other types of machinery. Shaft 60 may, in certain embodiments, be a cantilevered shaft, a half-shaft or stub shaft, a round shaft, a hexagonal shaft, or a shaft of various other configurations.

In order to reduce the moment on bearing 50 in the event that shaft 60 is deflected from nominal reference line 64, inner race 54 may include stepped interior portion 58 that is generally aligned with groove 56, but which does not extend all the way to axial edges 76 of inner race 54 (i.e., is separated from axial edges 76 by exterior portion 44). In general, an "exterior" portion may be viewed as a portion of a surface such as an inner race surface or an outer shaft surface that is oriented between an "interior" portion and the axial edges of the inner race. As depicted, interior portion 58 is separated from exterior portion 44 by slope transition locations 48a configured as square corners. In this way, the inner race 54 may contact the shaft 60 along the stepped interior portion 58, but may be spaced apart from the shaft 60 along the exterior portion 44 (i.e., may contact the shaft 60 axially inside of the slope transition locations 48a, but not axially outside of the slope transition locations 48a).

Figure 8A:
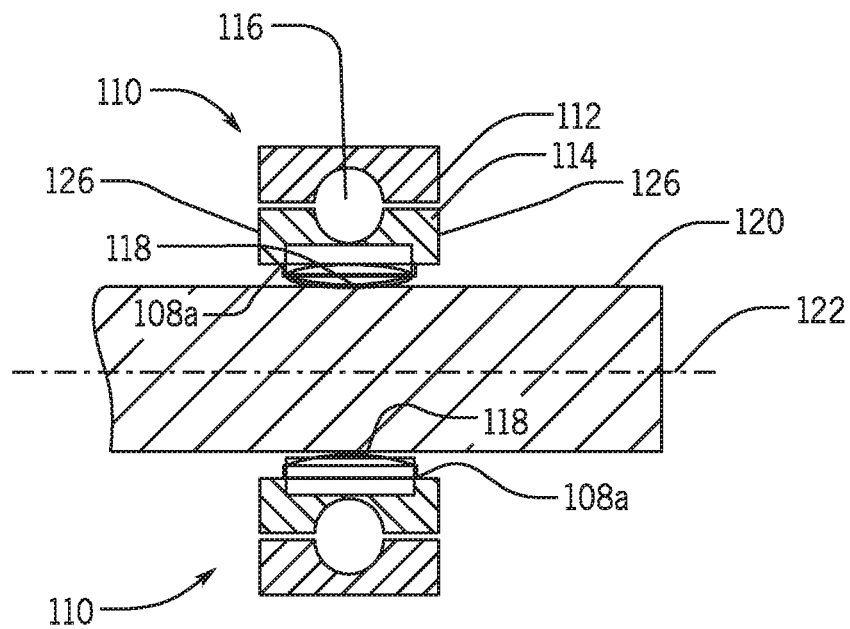
FIGS. 8A and 8B are schematic cross-sectional views of other example shaft and bearing assemblies according to the present disclosure.

Generally, including as depicted in FIG. 4A, a "stepped" portion of a component may define a radial extension away from a body of the component. As depicted in FIG. 4A, for example, the stepped portion 58 defines a radial extension away from the body of the inner race 54. As depicted, the radial extension of stepped portion 58 away from the body of the inner race 54 exhibits a constant radial dimension along the entire axial profile of the stepped portion 58. In other embodiments (e.g., as depicted in FIG. 8A), a stepped portion may exhibit different radial extensions (with different radial dimensions) along the axial profile.

Figure 4B:
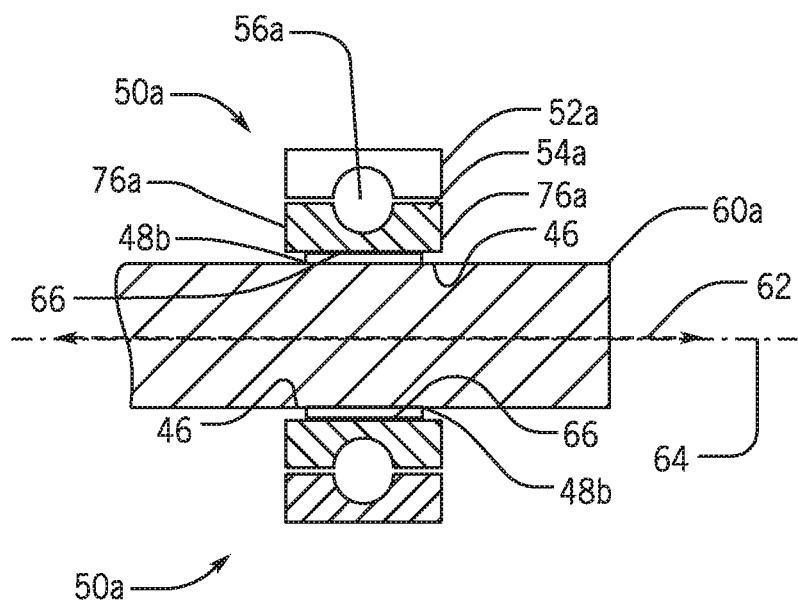

Referring also to FIG. 4B, in a similar embodiment, shaft 60a may similarly include stepped interior portion 66 that is generally aligned (e.g., centered) with groove 56a between inner race 54a and outer race 52a (and, accordingly, with the bearing members of bearing 50a), but which does not extend all the way to axial edges 76a of inner race 54 (i.e., is separated from axial edges 76 by exterior portion 46). As depicted, interior portion 66 is separated from exterior portion 46 by slope transition locations 48b configured as square corners. In this way, the inner race 54a may contact the shaft 60a along the stepped interior portion 66, but may be spaced apart from the shaft 60a along the exterior portion 46 (i.e., may contact the shaft 60a axially inside of the slope transition locations 48b, but not axially outside of the slope transition locations 48b).

Figure 5A:
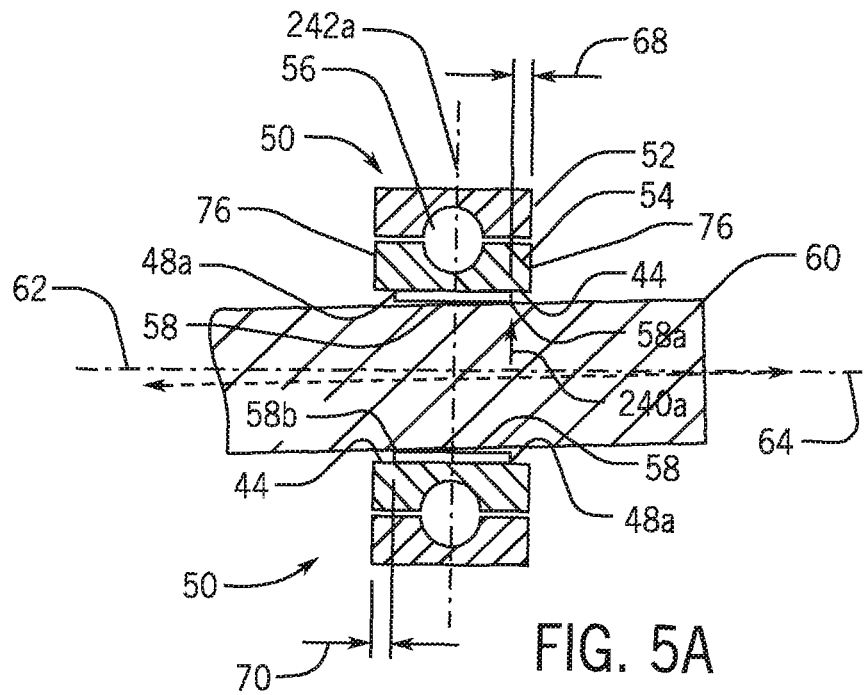
FIGS. 5A and 5B are schematic cross-sectional views, respectively, of the shaft and bearing assemblies of FIGS. 4A and 4B at a degree of deviation from a nominal axis of rotation.

Referring also to FIG. 5A, when shaft 60 is deflected from nominal reference line 64, shaft 60 may tend to apply a force to bearing 50 at point 58a, and possibly at point 58b, on stepped portion 58, rather than at axial edges 76 of inner race 54. Accordingly, the deflection of shaft 60 may tend to impose a moment on bearing 50 with a lever arm that is width 68, and possibly width 70, less than it would be without stepped portion 58 (i.e., than it would be if shaft 60 applied the force at axial edges 76 of inner race 54). In other words, for example, an effective line of action 240a of the moment may be applied at a location (e.g., the point 58a) that is axially removed from the axial edges 76 towards a central (e.g., ball) plane 242a of the bearing 50. In this way, stepped portion 58 may provide an engagement surface with shaft 60 that reduces the moment applied to bearing 50 when shaft 60 is deflected.

Figure 5B:
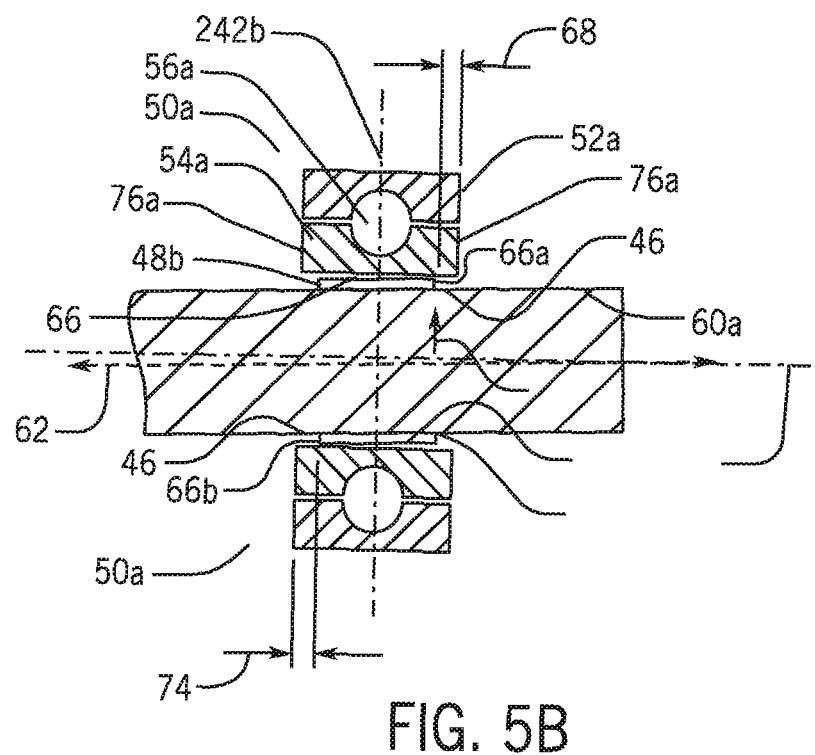

Similarly, referring also to FIG. 5B, when shaft 60a is deflected from nominal reference line 64, shaft 60a may tend to apply a force to bearing 50a at point 66a, and possibly at point 66b, on stepped portion 66, rather than at axial edges 76a of inner race 54a. Accordingly, the deflection of shaft 60a may tend to impose a moment on bearing 50a with a lever arm that is width 72, and possibly width 74, less than it would be without stepped portion 66 (i.e., than if shaft 60a applied the force axial edges 76a of inner race 54a). In other words, for example, an effective line of action 240b of the moment may be applied at a location (e.g., the point 66a) that is axially removed from the axial edges 76a towards a central (e.g., ball) plane 242b of the bearing 50. In this way, stepped portion 66 may provide an engagement surface with bearing 50a that reduces the moment applied to bearing 50a when shaft 60a is deflected.

In certain embodiments, the widths of the inner and outer races 54 and 52 (or other inner and outer races of other configurations) may vary from each other. For example, in certain embodiments, the inner race 54 may be axially narrower (i.e., narrower from left to right, as depicted in FIG. 4A) than the outer race 52. Similarly, in certain embodiments, the inner race 54a (or other inner races of other configurations) may be axially narrower than the interior portion 66 (or other interior portions on other shafts). For example, in certain embodiments, the interior portion 66 of the shaft 60*a* may extend axially outside of the axial edges 76*a* of the inner race 54*a*.

Other configurations may also be possible, alone or in combination with the stepped engagement surface described above. For example, referring also to FIG. 6A, bearing 80 may include outer race 82 and inner race 84 separated by groove 86, within which various bearing balls (or other bearing members) (not shown) may be seated. Inner race 84 may generally engage an outer surface of shaft 90 to enable relative co-rotation of shaft 90 and inner race 84 and the relative rotation of shaft 90 around relative axis of rotation 92 (e.g., as embodied by shaft 90 and inner race 84 remaining stationary while outer race 82 rotates around relative axis of rotation 92).

In order to reduce the moment on bearing 80 in the event that shaft 90 is deflected from nominal reference line 94, inner race 84 may include crowned interior portion 88 that is generally aligned with groove 86. As used herein, "crowned" or "crown" may generally refer to a contour that extends farther from a reference body at a central region than at one or more edge regions. Accordingly, a crowned portion of a body may include a first radial extension and a second radial extension, where the first radial extension exhibits a larger radial dimension than the second radial extension. For example, the axial middle of a crowned portion (e.g., a first radial extension of the crown) may exhibit a first radial dimension, while axially exterior parts of the crowned portion (e.g., second radial extensions of the crown) may exhibit a second, smaller radial dimension. In this way, for example, the crown may taper (smoothly or discontinuously), from a peak (i.e., maximum radial dimension) at the axial middle of the crown to the radial dimension of the supporting body (e.g., a race body or shaft body) at the axial edge of the crown.

Figure 6A:
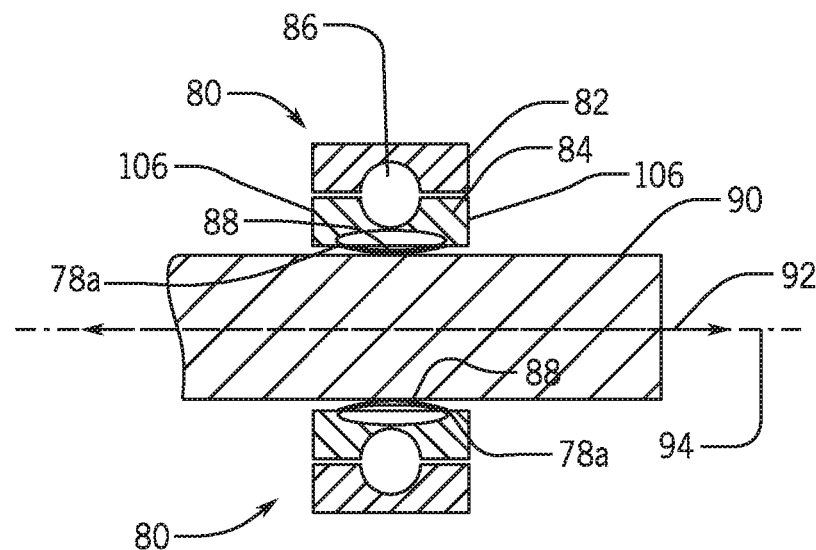
FIGS. 6A and 6B are schematic cross-sectional views of other example shaft and bearing assemblies according to the present disclosure.

As depicted in FIG. 6A, for example, crowned portion interior 88 includes a generally curved surface extending farther toward shaft 90 near groove 86 (i.e., exhibits a larger radial dimension in the axial center of inner race 84) than it does near axial edges 106 of inner race 84. Accordingly, the crowned portion 88 may include a larger radial dimension near the groove 86 than near the axial edges 106, such that when the inner race 84 engages the shaft 90, the crowned portion 88 contacts the shaft 90, while portions of the inner race 84 near the edges 106 are spaced apart from the shaft 90.

As depicted, the crowned portion 88 is separated from a non-crowned exterior portion of the shaft 90 by a slope transition location 78*a*. Accordingly, as depicted, crowned portion 88 does not extend all the way to edges 106. It will be understood, however, that other configurations may be possible. For example, one or both axial sides of a crowned portion of an inner race may extend to a point at (or near) an axial edge of the inner race.

Figure 6B:
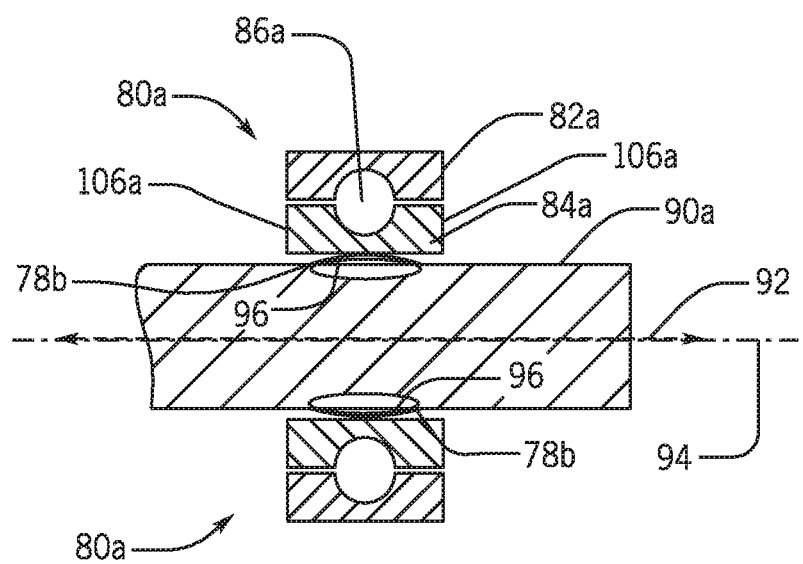

Referring also to FIG. 6B, in a similar embodiment, shaft 90*a* may similarly include crowned interior portion 96 that is generally centered with groove 86*a* between inner race 84*a* and outer race 82*a* (and, accordingly, is generally centered with the bearing members of bearing 80*a*). As depicted, the crowned portion 96 does not extend all the way to axial edges 106*a* of inner race 84*a*, but is separated from a non-crowned exterior portion of the inner race 84*a* by a slope transition location 78*b*. It will be understood, however, that other configurations may be possible. For example, one or both axial sides of a crowned portion of a shaft may extend to a point at (or near, or axially beyond) an axial edge of the inner race engaging the shaft.

Figure 7A:
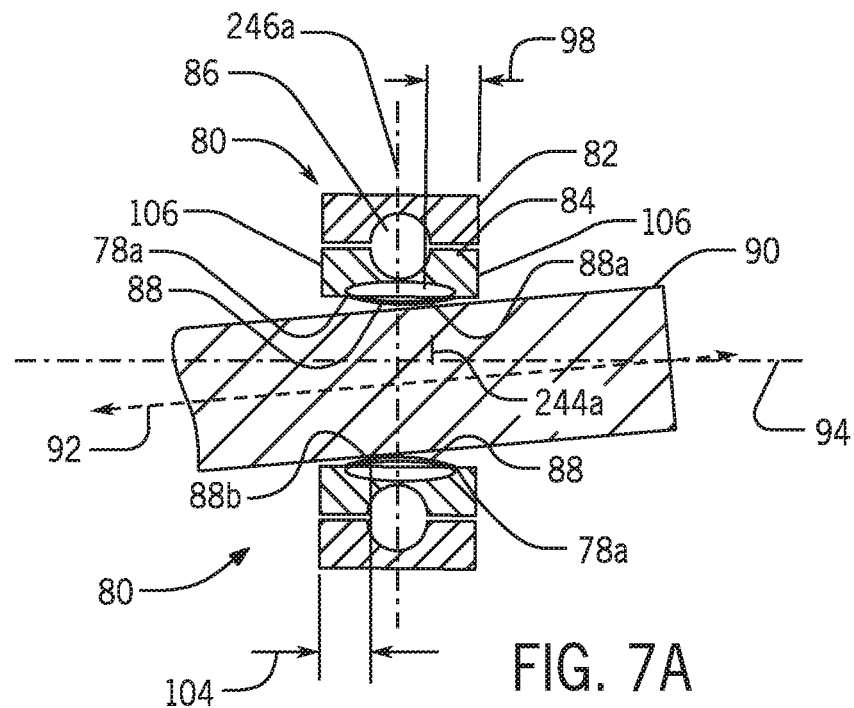
FIGS. 7A and 7B are schematic cross-sectional views, respectively, of the shaft and bearing assemblies of FIGS. 6A and 6B at a degree of deviation from a nominal axis of rotation.

Referring also to FIG. 7A, when shaft 90 is deflected from nominal reference line 94, shaft 90 may tend to apply a force to bearing 80 at point 88*a*, and possibly at point 88*b*, on crowned portion 88, rather than at axial edges 106 of inner race 84. Accordingly, the deflection of shaft 90 may tend to impose a moment on bearing 80 with a lever arm that is width 98, and possibly width 100, less than it would be without crowned portion 88 (i.e., than it would be if shaft 90 applied the force at axial edges 106 of inner race 84). In other words, for example, an effective line of action 244*a* of the moment may be applied at a location (e.g., the point 88*a*) that is axially removed from the axial edges 106 towards a central (e.g., ball) plane 246*a* of the bearing 80. In this way, crowned portion 88 may provide an engagement surface with shaft 90 that reduces the moment applied to bearing 80 when shaft 90 is deflected.

Figure 7B:
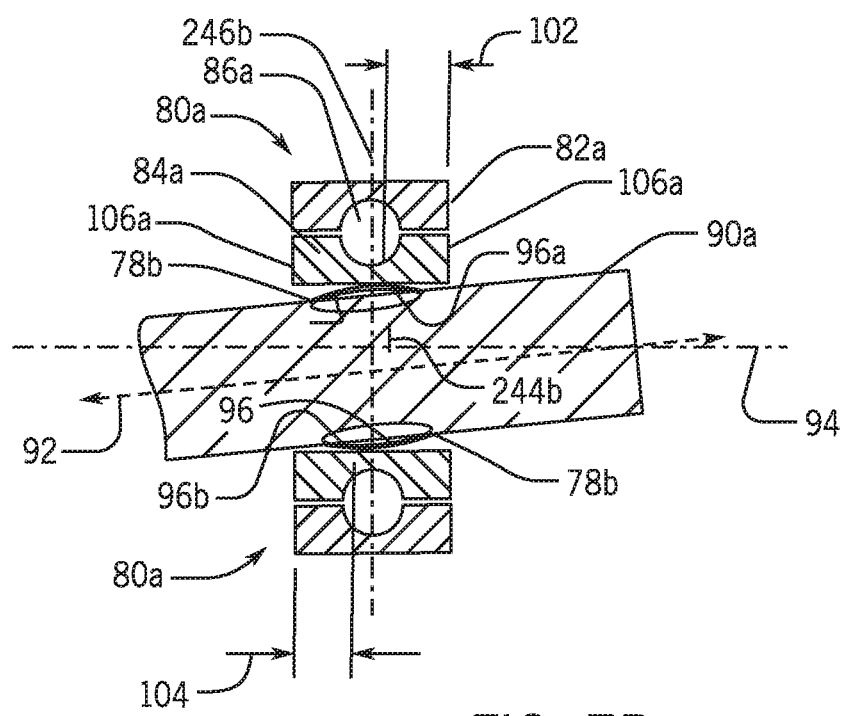

Similarly, referring also to FIG. 7B, when shaft 90*a* is deflected from nominal reference line 94, shaft 90*a* may tend to apply a force to bearing 80*a* at point 96*a*, and possibly at point 96*b*, on crowned portion 96, rather than at axial edges 106*a* of inner race 84*a*. Accordingly, the deflection of shaft 90*a* may tend to impose a moment on bearing 80*a* with a lever arm that is width 102, and possibly width 104, less than it would be without crowned portion 96 (i.e., than if shaft 90*a* applied the force at axial edges 106*a* of inner race 84*a*). In other words, an effective line of action 244*b* of the moment may be applied at a location (e.g., the point 96*a*) that is axially removed from the axial edges 106*a* towards a central (e.g., ball) plane 246*b* of the bearing 80*a*. In this way, crowned portion 96 provides an engagement surface with shaft 90*a* that reduces the moment applied to bearing 80*a* when shaft 90*a* is deflected.

As noted above, various combinations or variations of the configurations discussed above (and others) may be possible. Referring also to FIG. 8A, for example, shaft 120 may generally support bearing 110 for relative rotation around relative axis of rotation 122 (or may be supported for relative rotation by bearing 110), with bearing 110 including inner race 114, outer race 112, and internal groove 116. In certain embodiments, inner race 114 may include stepped and crowned interior portion 118, which may be generally centered with groove 116 and which may extend only partly across the axial width of inner race 114 (i.e., only partly between axial edges 126). As depicted, the stepped and crowned portion 118 is separated from a non-stepped and non-crowned crowned exterior portion of the inner race 114 by a slope transition location 108*a*.

Figure 8B:
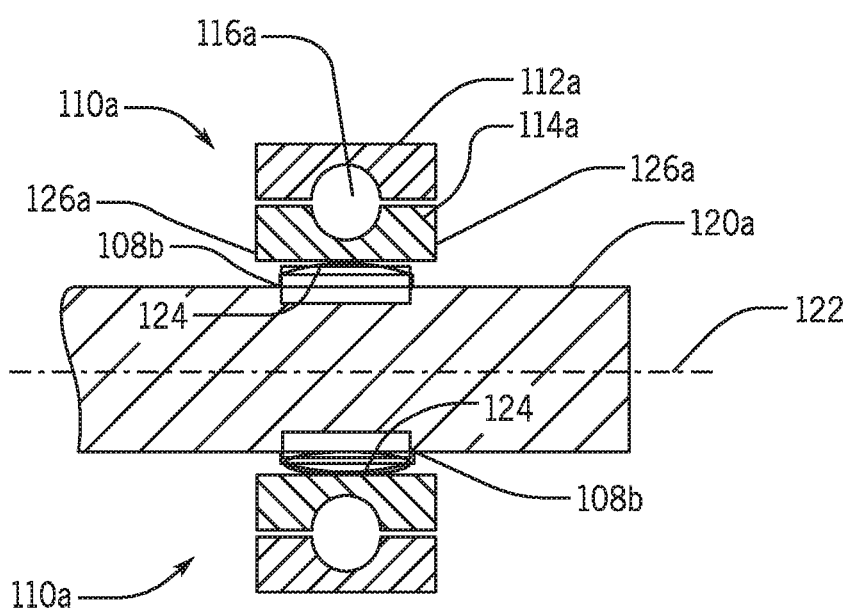

Similarly, referring also to FIG. 8B, shaft 120*a* may generally support bearing 110*a* for relative rotation around relative axis of rotation 122 (or may be supported for relative rotation by bearing 110*a*), with bearing 110*a* including inner race 114*a*, outer race 112*a*, and internal groove 116*a*. Shaft 120*a* may include stepped and crowned portion 124, which may also be generally centered with groove 116 and which may extend only partly across the axial width of inner race 114*a* (i.e., only partly between axial edges 126*a*). As depicted, the stepped and crowned portion 124 is separated from a non-stepped and non-crowned crowned exterior portion of the shaft 120*a* by a slope transition location 108*b*.

Interior portions 118 and 124 may reduce the moment applied, respectively, to bearings 110 and 110*a* upon deflection of shafts 120 and 120*a* in a similar matter as described above with regard to the embodiments of FIGS. 5A, 5B, 7A and 7B. For example, the inner races 114 and 114*a* may contact the shafts 120 and 120*a*, respectively, along the stepped and crowned portions 118 and 124, but may be spaced apart from the shafts 120 and 120a along the exterior portions of the inner race 114 and the shaft 120a, respectively (i.e., may contact the shafts 120 and 120a axially inside of the slope transition locations 108a and 108b, but not axially outside of the slope transition locations 108a and 108b).

Shaft 120a is depicted without a chamfer (e.g., at the axially outer edges of the inner race 114a or of the stepped and crowned portion 124). In some embodiments, shaft 120a or other shafts may include chamfers at various locations. In some embodiments, for example, various steps (e.g., the step of the stepped and crowned portion 124) may be replaced by chamfers.

As also noted above (see discussion of FIG. 4A), a "stepped" portion of a component may define a radial extension away from a body of the component. As depicted in FIG. 8A, for example, the stepped and crowned portion 118 defines a radial extension away from the body of the inner race 114 that exhibits a larger radial dimension towards the axial center of the portion 118 (i.e., as generally radially aligned with the groove 116) and smaller radial dimensions toward the axial edges of the portion 118.

In certain embodiments, both an outer surface of an inner race of a bearing and an outer surface of a shaft may be contoured to reduce moments applied to the bearing. For example, in certain embodiments, a shaft may include a stepped and crowned portion similar to portion 124 of FIG. 8B, and a bearing supported by (or supporting) the shaft may include a stepped portion similar to portion 58 of FIG. 5A. Any number of other combinations and variations may also be possible. For example, an interior portion on the surface of an inner race (or shaft) may be crowned, while an interior portion on the surface of a corresponding shaft (or inner race) may be stepped. Similarly, for example, an interior portion on the surface of an inner race (or shaft) may be stepped, while an interior portion on the surface of a corresponding shaft (or inner race) may be crowned.

Figure 10:
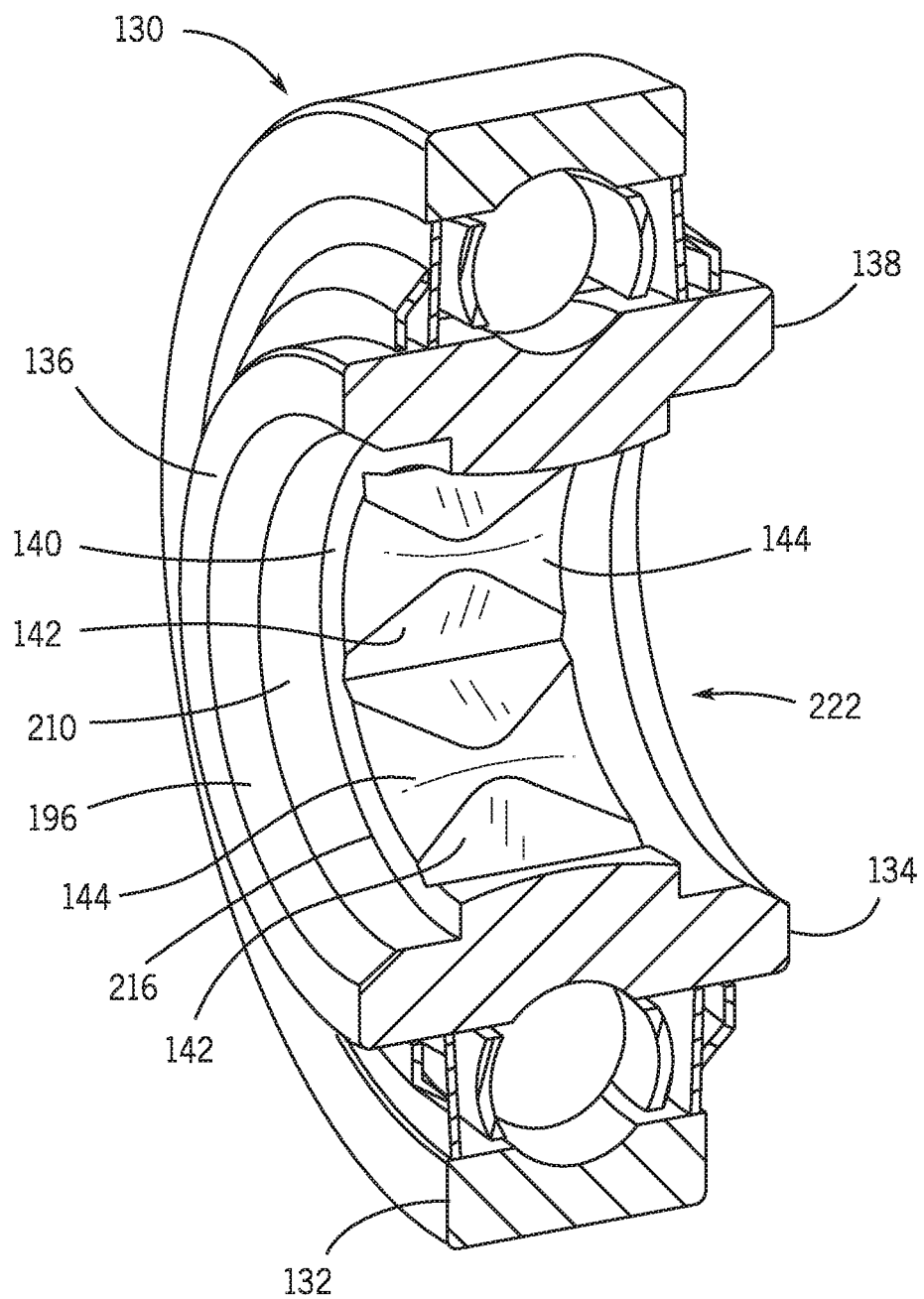
FIG. 10 is a partial perspective view of the bearing of FIG. 9, showing a section taken along plane A-A of FIG. 9.

In certain embodiments, a stepped and crowned (or stepped, or crowned) portion of either a shaft or an inner race may include various additional contours or features. Referring also to FIGS. 9 and 10, for example, bearing 130 may include outer race 132 and inner race 134 with a plurality of bearing balls (or other bearing members) (not shown) allowing relative rotation of the two races 132 and 134. In certain embodiments, inner race 134 may include stepped portion 140, the exterior edges of which may be axially inward from axial edges 136 and 138 of inner race 134. As depicted, stepped portion 140 is separated from an exterior region 210 including a chamfer 196 by a slope transition location 216.

Stepped portion 140 may be configured to include various features or profiles. In certain embodiments, for example, stepped portion 140 may include various recesses 142, which may assist in engaging an associated shaft and transmitting rotational forces between inner race 134 and the shaft and may generally define a non-circular bore 222. For example, v-shaped indents 142 or other indents or notches may be formed (e.g., cast or machined) in the inner surface of stepped portion 140, which may be engaged by complimentary features or contours on an associated shaft. In certain embodiments, stepped portion 140 may be generally flat (e.g., may exhibit the same extension toward a shaft carried by bearing 130 across the entire axial width of portion 140).

In certain embodiments, as depicted in FIG. 9, stepped portion 140 may include a crowned profile. As such, for example, v-shaped indents 142 may be spaced alternately with crowned raised regions 144 around the circumference of stepped portion 140. In certain embodiments, raised regions 144 may not be crowned and may, accordingly, include a flat axial profile, a stepped axial profile, or another geometry.

Figure 11:
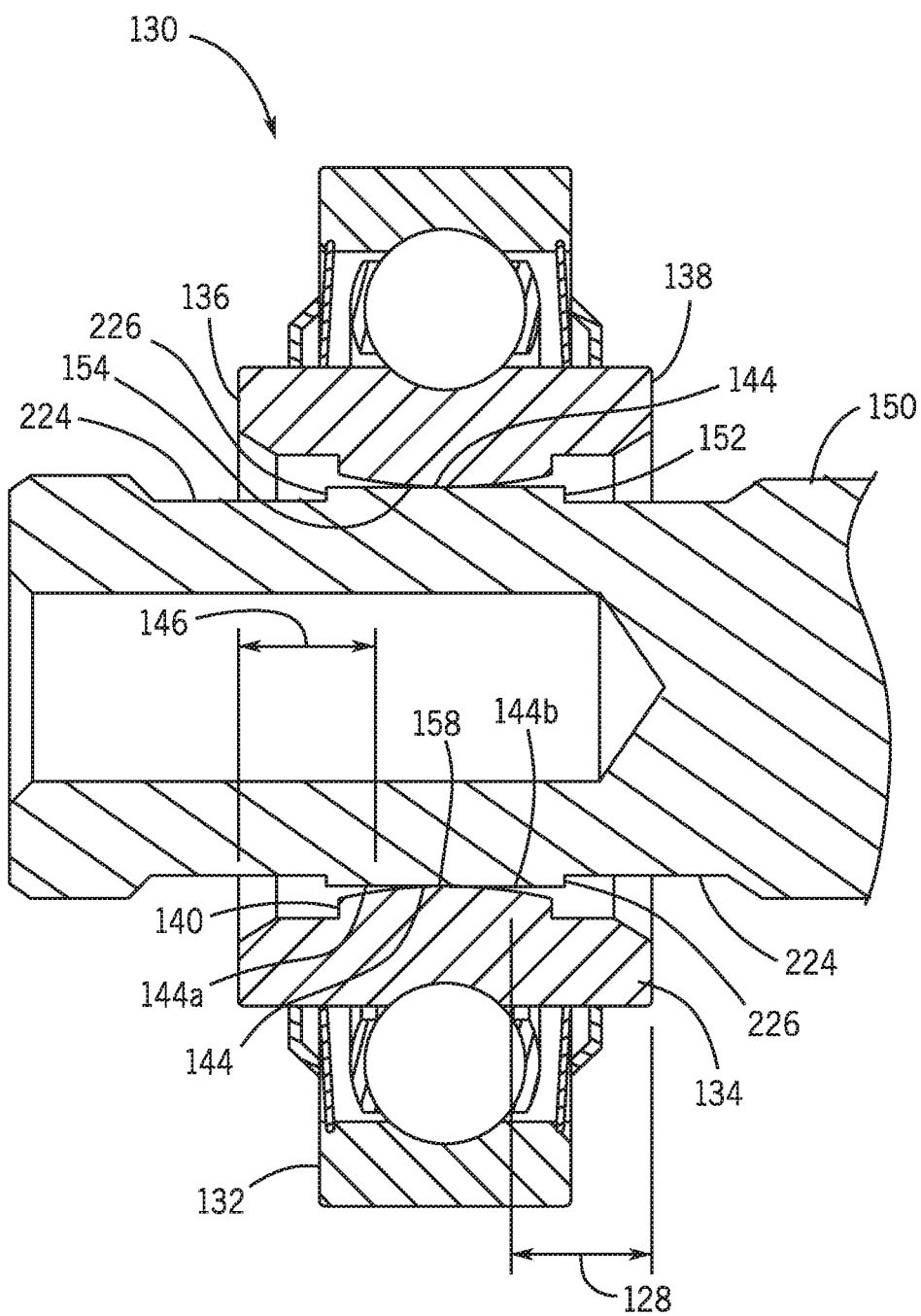
FIG. 11 is a sectional view of the shaft and bearing of FIG. 9, in an assembled configuration, taken along plane A-A of FIG. 9.
Figure 13:
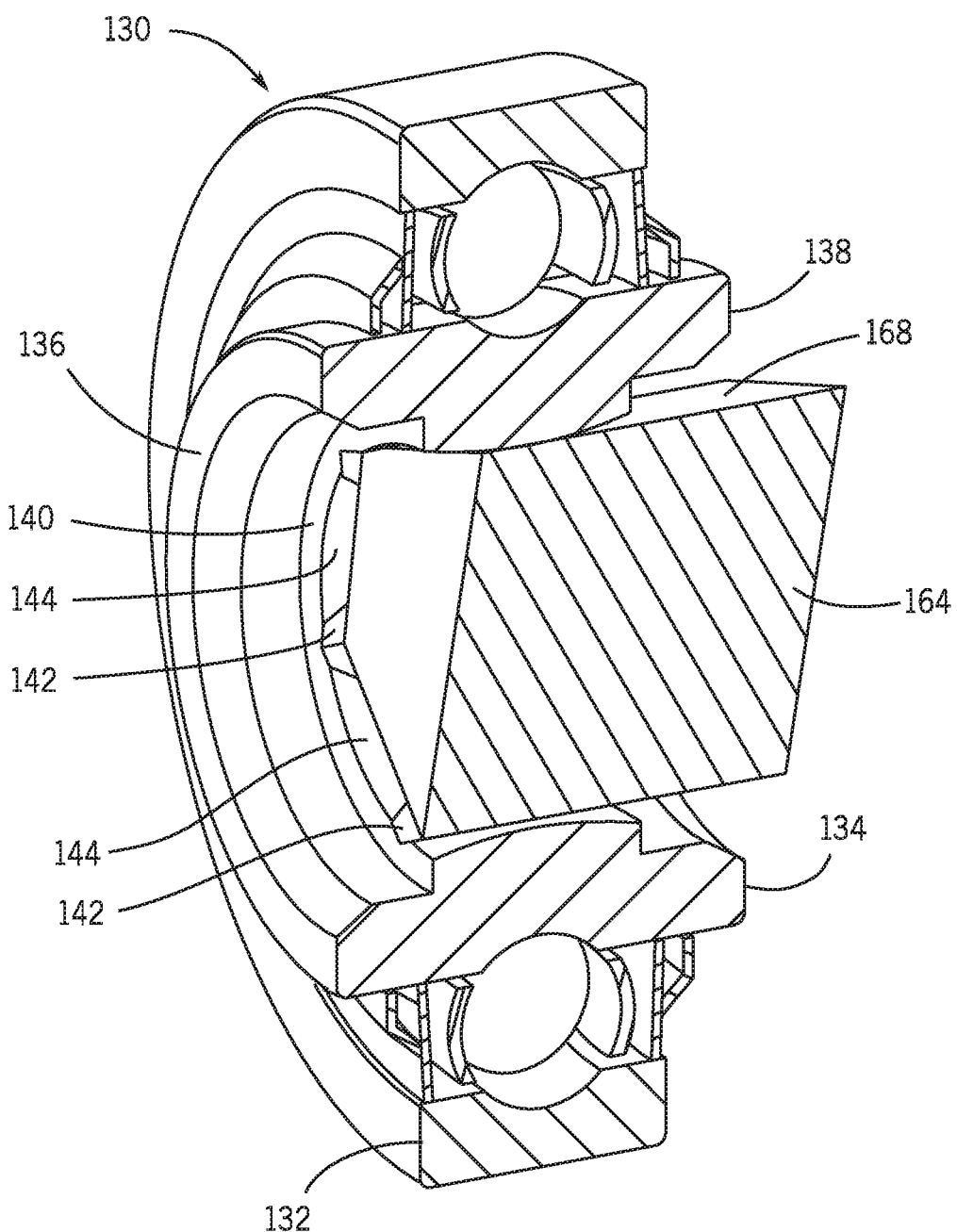
FIG. 13 is a partial perspective view similar to FIG. 10, with an alternative shaft configuration.

Still referring to FIG. 9, in certain embodiments, shaft 150 may be configured to include an outer surface that is generally complimentary to the inner surface provided by stepped portion 140, indents 142 and crowned portions 144. For example, shaft 150 may include stepped portion 152 defining a region of generally larger radius than axially adjacent portions of shaft 150 (e.g., exterior portions 224). Stepped portion 152, as depicted in FIGS. 9 and 11, may include a crowned axial profile, or may include a flat or other axial profile, and may be separated from the exterior portions 224 by slope transition locations 226. In certain embodiments, flat regions, such as elliptical regions 154 may be formed (e.g., machined, forged, fabricated, and so on) at intervals around the circumference of stepped portion 152, which may result in an alternating arrangement of flattened regions 154 and raised regions 156 and, generally, a non-circular profile for the shaft 150 at the stepped portion 152. In an embodiment having a crowned profile along stepped portion 152, as depicted in FIG. 9, raised regions 156 may be generally crowned regions. Due to the elliptical shape of flattened regions 154 (as depicted in FIG. 9), such crowned regions 156 may exhibit a generally hourglass-shaped profile. It will be understood, however, that other configurations may be possible. For example, in an embodiment in which stepped portion 152 exhibits a polygonal cross-section (e.g., an embodiment in which portion 152, without flattened regions 154 defines a generally hexagonal cross-section, as depicted in FIG. 13), raised regions 156 may include sharp (or rounded) edges.

The various contours and profiles of the outer surfaces of shaft 150 (or another shaft) and inner race 134 (or another inner race) may generally cooperate to secure shaft 150 (or another shaft) for relative co-rotation with inner race 134, while also providing for a generally reduced moment on bearing 130 (or another bearing) in the event of a deflection of shaft 150. Referring also to FIG. 11, for example, in some configurations, flattened regions 154 of shaft 150 may generally align with crowned regions 144 of inner race 134 to provide rotational engagement between shaft 150 and inner race 134, while also potentially providing for a reduced moment on bearing 130 in the event of deflection of shaft 150. For example, upon deflection of shaft 150, crowned regions 144 may contact inner race 134 at axially outermost locations corresponding to point 144a, and possibly point 144b. Accordingly, shaft 150 may apply a moment to bearing 130 with a lever arm that is width 146 (and possibly width 128) less than if the force were applied at axial edges 136 and 138. In some configurations, flattened regions 154 of shaft 150 may generally not engage with crowned regions 144 (or other regions) of shaft 150.

Figure 12:
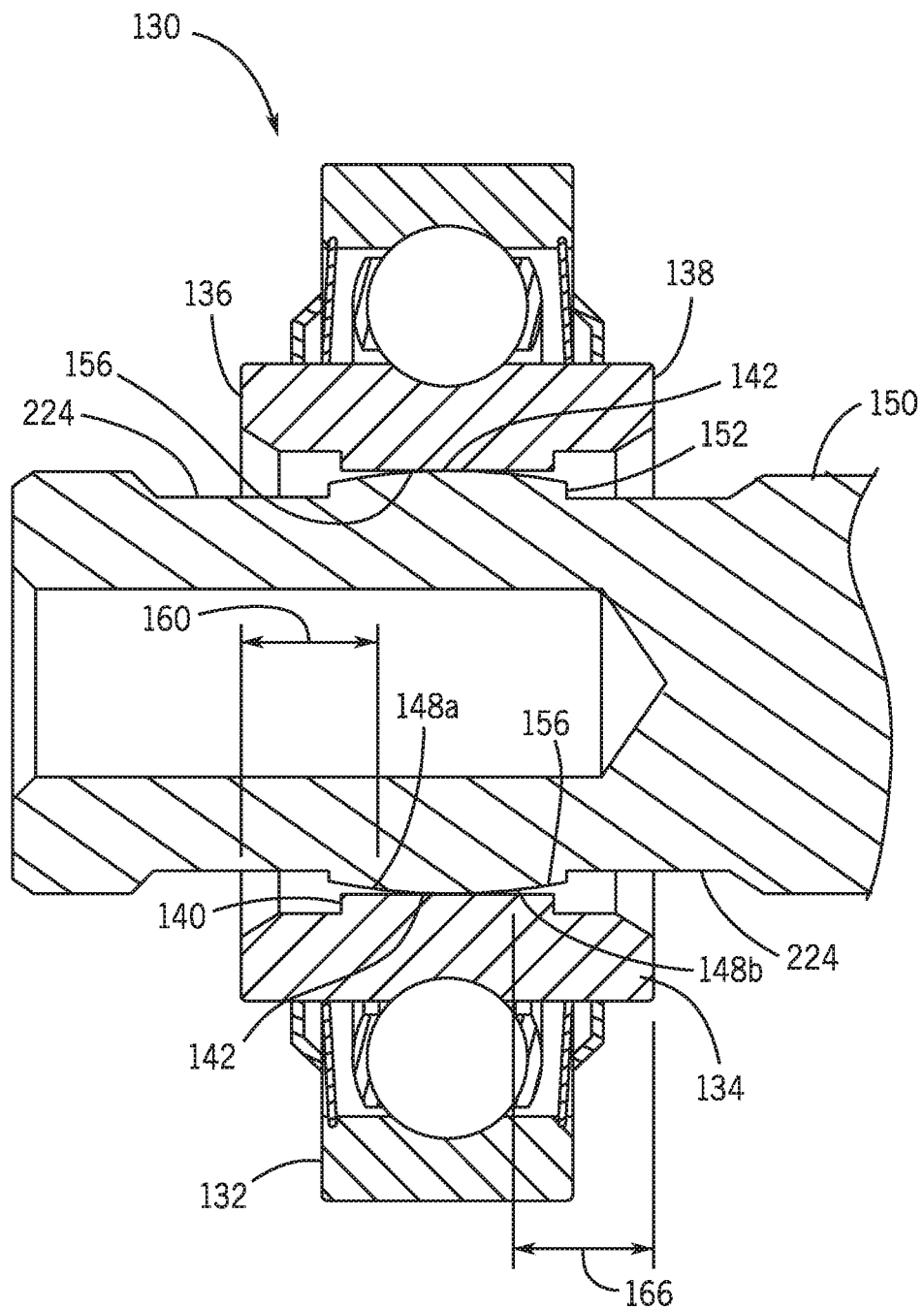
FIG. 12 is another section view of the shaft and bearing of FIG. 9, in an assembled configuration, taken along plane B-B of FIG. 9.

Further, referring also to FIG. 12, crowned raised regions 156 of shaft 150 may generally seat within (and thereby engage) indents 142 to also provide rotational engagement for inner race 134 and shaft 150, while also potentially reducing the moment on bearing 130 in the event of deflection of shaft 150. For example, upon deflection of shaft 150, corner regions 142 may contact inner race 134 at axially outermost locations corresponding to point 148a, and possibly point 148b. Accordingly, shaft 150 may apply a moment to bearing 130 with a lever arm that is width 160 (and possibly width 166) less than if the force were applied at axial edges 136 and 138.

Figure 14:
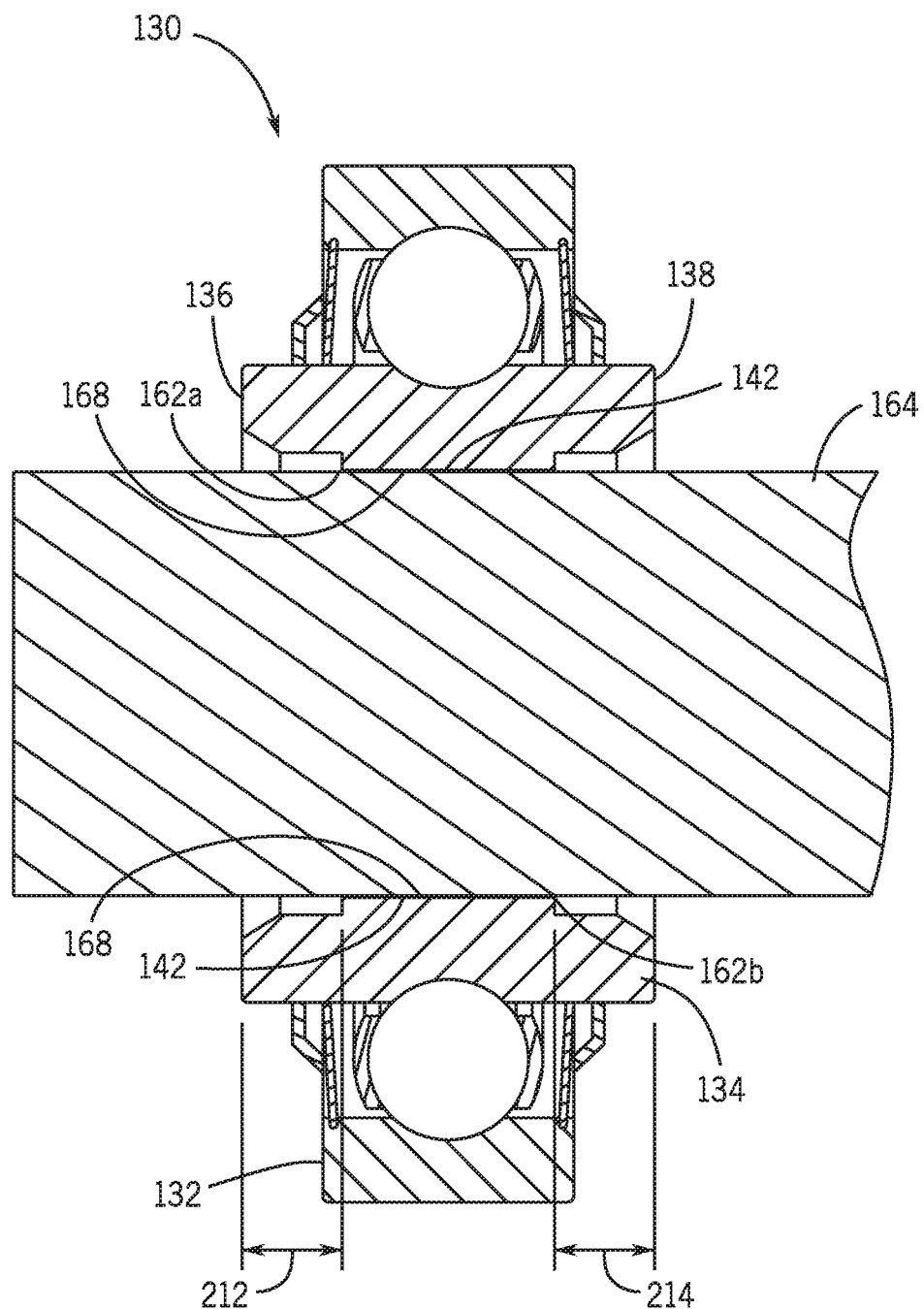
FIG. 14 is a sectional view similar to FIG. 12, with the alternative shaft configuration of FIG. 13.

Generally, it will be understood that various combinations of steps, crowns, non-stepped, non-crowned, and other geometries may be utilized in various combinations of shafts and bearings. In certain embodiments, as also noted above, raised regions 156 may not be crowned, the relevant shaft may exhibit a generally polygonal cross-section, or the relevant shaft may not exhibit a stepped interior portion. Referring also to FIGS. 13 and 14, for example, non-stepped hexagonal shaft 164 may include edges 168 that may be configured to seat within indents 142 on stepped portion 140 of inner race 134. In such a configuration, edges 168 may provide rotational engagement with inner race 134 while also potentially reducing the moment on bearing 130 in the event of deflection of shaft 164. For example, upon deflection of shaft 164, edges 168 of hexagonal shaft 164 may contact inner race 134 at axially outermost locations corresponding to point 162*a*, and possibly 162*b*. Accordingly, shaft 164 may apply a moment to bearing 130 with a lever arm that is width 212, and possibly width 214, less than if the force were applied at axial edges 136 and 138.

Figure 15:
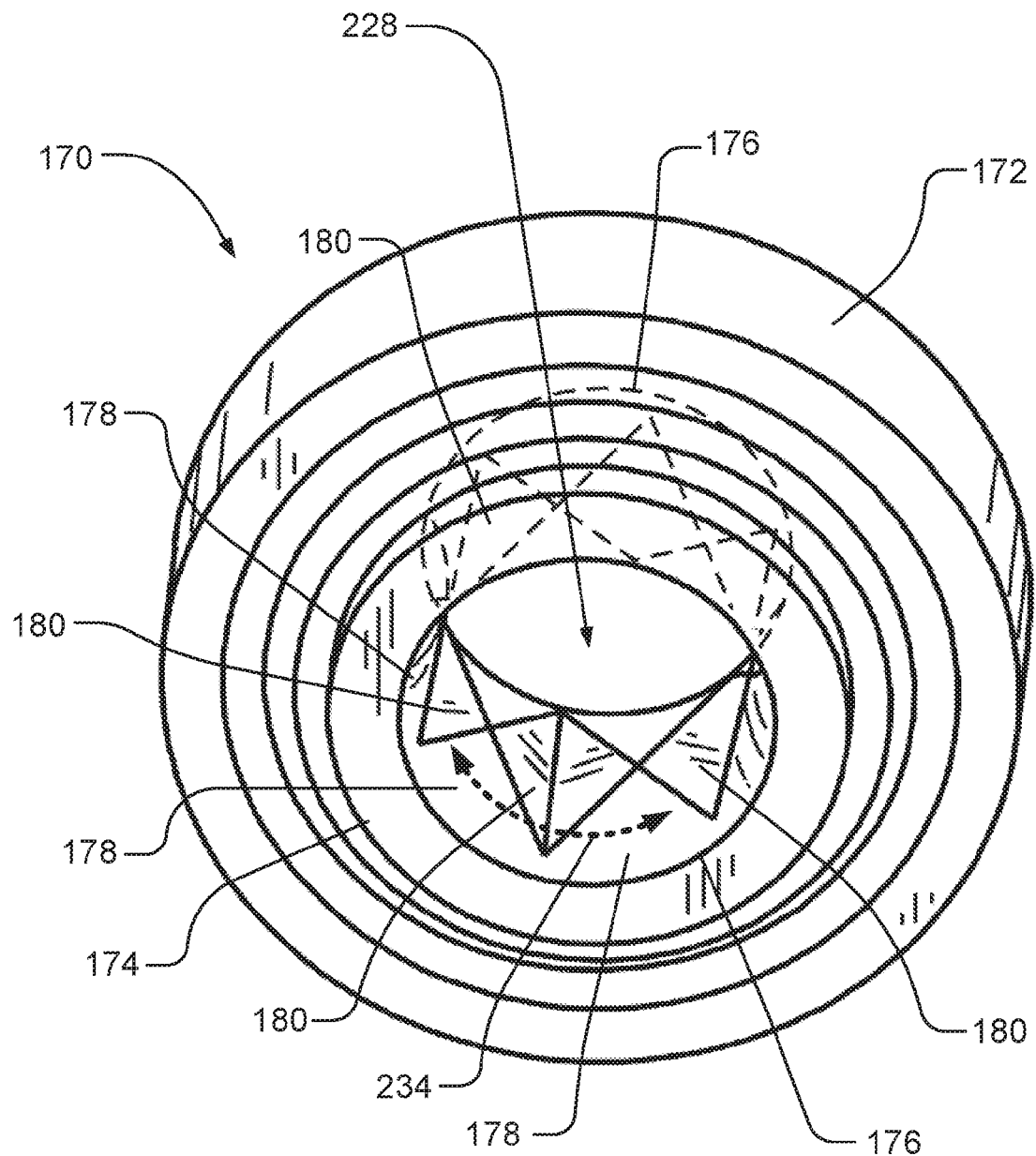
FIG. 15 is a perspective view of another example bearing.

Various other configurations may also be possible. For example, referring also to FIG. 15, bearing 170 may include outer race 172 and inner race 174. Crowned region 178 on inner race 174 may extend the full distance between axial edges 176 of inner race 174 (i.e., may not be stepped), and may include various indents 180 (v-shaped or otherwise configured) arranged around the crowned inner surface of inner race 174 to generally define a non-circular bore 228. In various embodiments, indents 180 may or may not also extend the full distance (or nearly the full distance) between axial edges 176.

As depicted, the indents 180 may at least partly provide corresponding engagement portions at which a shaft (not shown) may contact the inner race 174 for co-rotation. Likewise, the crowned region 178 may at least partly provide corresponding separation portions at which the shaft (not shown) may not contact the inner race 174. In this way, a deflection of the shaft (not shown) may impose a moment on the bearing 170 at points that are axially inward of the axial edges 176 of the inner race 174. Also as depicted, the indents 180 and the crowned region 178 are interleaved, such that a reference circumferential line 234 pass alternately through the indents 180 and the crowned region 178.

Figure 16:
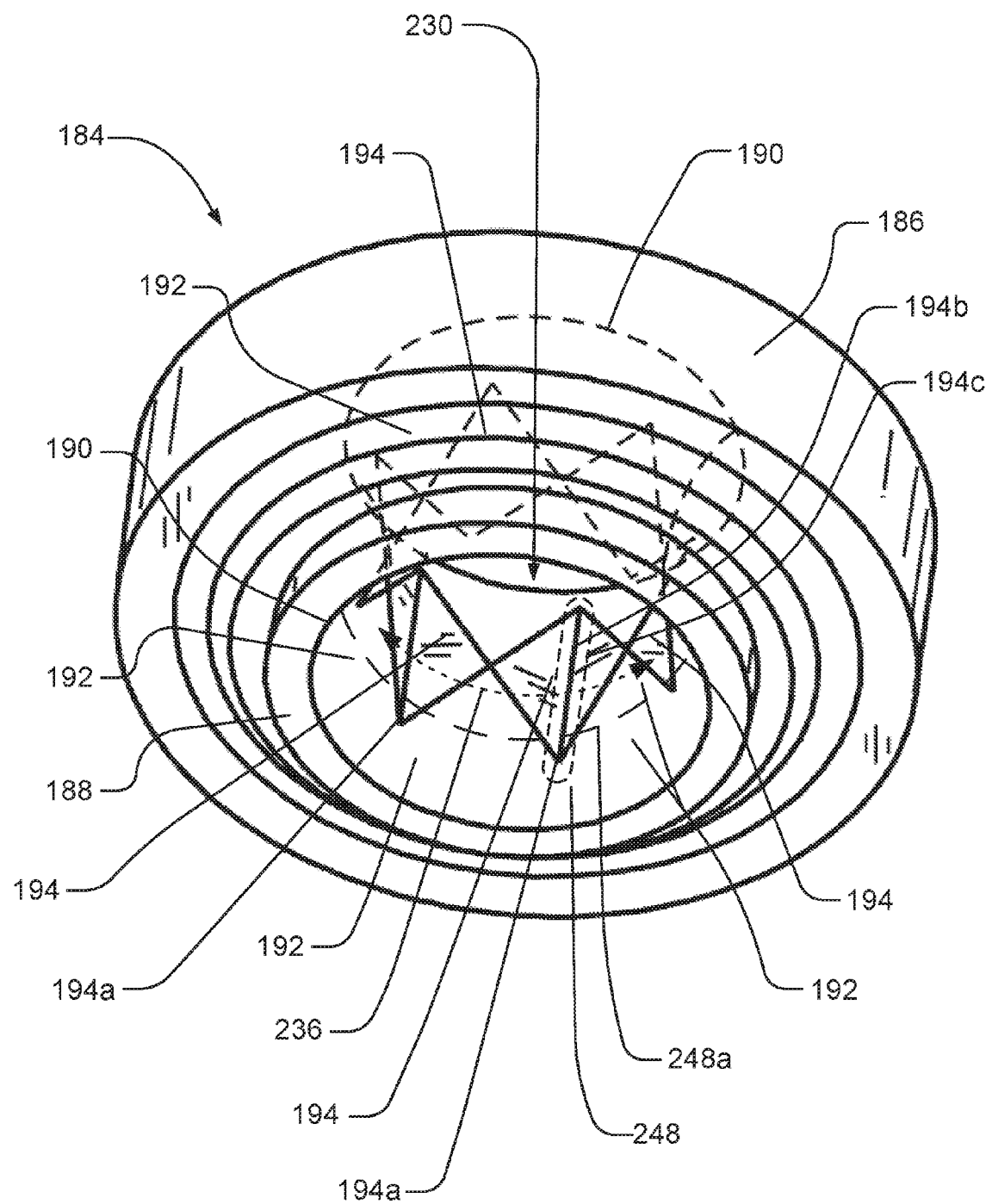
FIG. 16 is a perspective view of yet another example bearing.

As another example, and referring also to FIG. 16, in certain embodiments, bearing 184 may include outer race 186 and inner race 188. Crowned region 192 may extend the full distance between axial edges 190 of inner race 188 (i.e., may not be stepped), and may include various indents 194 (v-shaped or otherwise configured) arranged around the crowned inner surface of inner race 188 to generally define a non-circular bore 230. In various embodiments, indents 194 may or may not extend the full distance (or nearly the full distance) between axial edges 190. In certain embodiments, indents 194 may extend a smaller percentage of the distance between axial edges 190 than indents 180 on bearing 170 (FIG. 15) extend between axial edges 176.

As depicted, the indents 194 may at least partly provide corresponding engagement portions at which a shaft (not shown) may contact the inner race 188 for co-rotation. Likewise, the crowned region 192 may at least partly provide corresponding separation portions at which the shaft (not shown) may not contact the inner race 188. In this way, a deflection of the shaft (not shown) may impose a moment on the bearing 184 at points that are axially inward of the axial edges 190 of the inner race 188. Also as depicted, the indents 194 and the crowned region 192 are interleaved, such that a reference circumferential line 236 passes alternately through the indents 194 and the crowned region 192.

In some embodiments, region 192 (or a portion thereof) may include or be adjacent to a chamfered profile. For example, instead of having a crowned profile, region 192 may be generally flat (or otherwise contoured) along an interior portion, with an exterior chamfer. Still referring to FIG. 16, for example, chamfer 248 may extend axially inward from axial edges 190 of inner race 188, with slope transition location 248*a* marking an inward edge of chamfer 248.

As depicted, chamfer 248 extends sufficiently inward of the outer ends of various indents 194, such that slope transition location 248*a* intersects indents 194 axially inward of the axially outer ends of indents 194. Where chamfer 248 is appropriately sloped, the addition of chamfer 248 to inner race 188 may accordingly result in removal of end portions 194*a* of indents 194. As such, with chamfer 248, deflection of a shaft seated in indents 194 may result in application of force to indents 194 (and, thereby, to bearing 184) axially inward, but not axially outward, of slope transition location 248*a*.

With appropriate chamfer geometry, this benefit may obtain even if indents 194, as originally formed, have end portions 194*a* that extend (in the absence of chamfer 248) to axial edges 190 of inner race 188. In such a configuration, for example, an appropriately sloped configuration of chamfer 248 extending inward of axial edges 190 of inner race 188 may remove end portions 194*a* to a point that is axially inward of race edges 190, such that a shaft seated in indents 194 may apply a force, when the shaft is deflected, at locations that are axially inward of edges 190. It will be understood that similar effects may also be obtained through the addition (or substitution) of chamfered profiles to various other indented inner races (e.g., inner races 134, 174, and 202 of FIGS. 10, 15, and 17, respectively). In some embodiments, chamfer 248 may intersect the deepest points of indents 194 (e.g., at the bottom of the depicted V-shaped profiles) at an axially outermost location that is axially inward of axial edges 190 by 5% or more of the width of inner race 188 (e.g., as measured between axial edges 190).

In other embodiments, a chamfer similar to chamfer 248 may extend only to (or stop short of) the axially outer ends of certain recesses. For example, still referring to FIG. 16, slope transition location 248*a* may alternatively (or additionally) be aligned with or axially outside of end portions 194*a*.

In other embodiments, other contours may cause deflected shafts to impose a force along an effective line of action that is axially inward of the outer edges of a bearing race. For example, in some embodiments, a recess such as one of the indents 194 may be widened or deepened at an inner vertex (e.g., widened and deepened to profile 194*c* at vertex 194*b*), such that a shaft seated in the recess contacts surfaces of the recesses, rather than the inner vertex, at locations that are radially inward from the inner vertex and axially inward from the axially outer edges of the bearing race.

Figure 17:
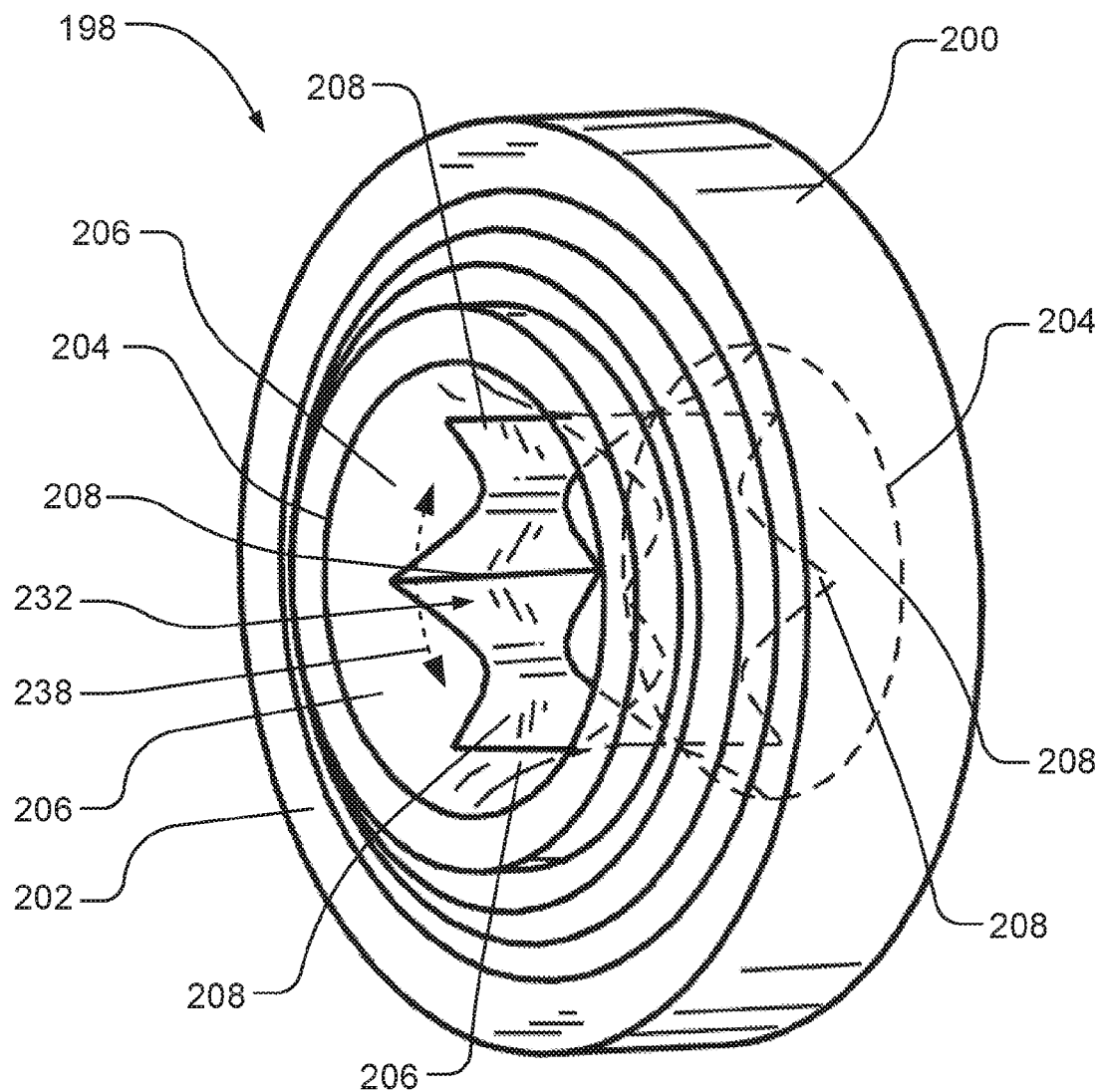
FIG. 17 is a perspective view of still another example bearing.

As yet another example, and referring also to FIG. 17, in certain embodiments, bearing 198 may include outer race 200 and inner race 202. Crowned region 206 may extend the full distance between axial edges 204 of inner race 202, with various indents 208 (v-shaped or otherwise configured) arranged around the inner surface of inner race 202 to generally define a non-circular bore 232. As depicted in FIG. 17, in certain embodiments, various indents 208 may intersect to form a generally continuous indent profile around the crowned inner surface of inner race 202 (e.g., a generally continuous indent profile on crowned region 206). With respect to this configuration and similar configurations, it will be understood that crowned region 206 may still be viewed as being arranged alternately with indents 208, around the inner surface of inner race 202. For example, it may be seen that interior portions of crowned region 206 may axially overlap with exterior portions of indents 208, such that these portions of region 206 and indents 208 alternate with respect to a local inner circumference of inner race 202.

As depicted, the indents 208 may at least partly provide corresponding engagement portions at which a shaft (not shown) may contact the inner race 202 for co-rotation. Likewise, the crowned region 206 may at least partly provide corresponding separation portions at which the shaft (not shown) may not contact the inner race 202. In this way, a deflection of the shaft (not shown) may impose a moment on the bearing 198 at points that are axially inward of the axial edges 204 of the inner race 202. Also as depicted, the indents 208 and the crowned region 206 are interleaved, such that a reference circumferential line 238 passes alternately through the indents 208 and the crowned region 206.

It will be understood that various inner surfaces of inner races or outer surfaces of shafts may exhibit varying profiles along axial, circumferential, or other reference lines. For example, the various embodiments of bearings depicted in FIGS. 15-17 include inner bearing surfaces with both crowned profiles and indented or recessed profiles. In certain embodiments, an inner surface of an inner race or an outer surface of a shaft may include various sequences or arrangements of flat, crowned, recessed, or other profiles, from the perspective of an axial, circumferential, or other reference line. For example, shaft 150 of FIG. 9 includes an inner bearing surface with a profile that varies between flat and crowned, with respect to a circumferential reference line. Similarly, bearing 130 of FIG. 9 includes an outer shaft surface with a profile that varies between crowned and recessed (with flat sides), with respect to a circumferential reference line. Various other configurations may also be possible.

Figure 18:
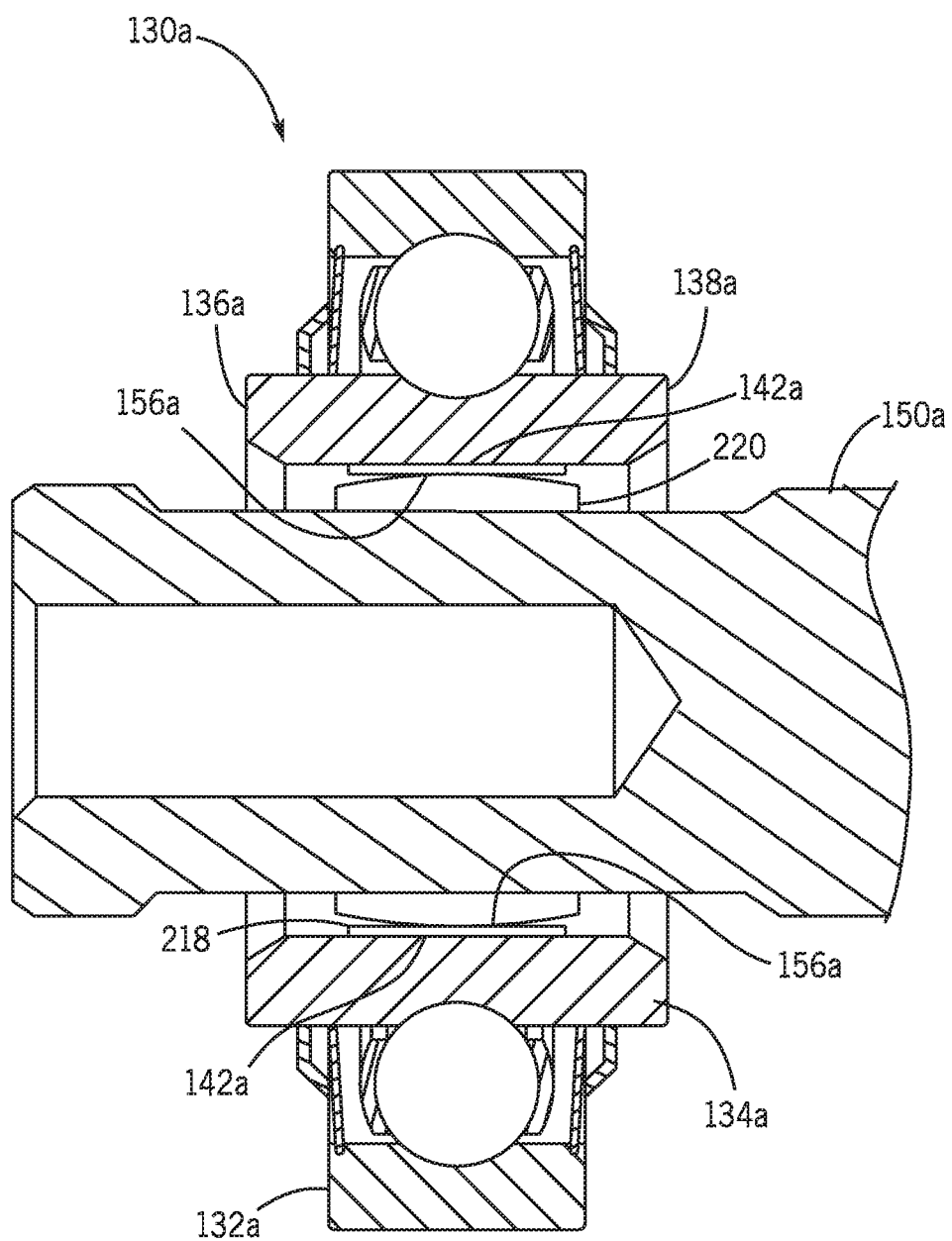
FIG. 18 is a sectional view similar to FIG. 12, with a shaft sleeve and bearing insert.

Various embodiments described above may include an inner and outer surfaces that are integrally formed with a particular inner race or outer shaft surface, respectively. In certain embodiments, such a surface (e.g., a stepped, crowned, indented, or otherwise configured surface) may be separately formed on a removable insert or sleeve, which may be seated within in or mounted around, respectively, a particular inner race or shaft. In this way, for example, a standard inner race or shaft configuration may be utilized for a variety of embodiments, with a customized insert or sleeve being employed to provide the desired profile for the respective surfaces. For example, referring also to FIG. 18, bearing 130a may include outer race 132a and inner race 134a, with inner race 134a supported by (or supporting) shaft 150a. Insert 218 may be mounted to inner race 134a to provide recessed portion 142a of an inner surface of the inner race 134a, between edges 136a and 138a of inner race 134a. Similarly, sleeve 220 may be mounted to shaft 150a to provide crowned portion 156a of an outer surface of the shaft 150a, also between edges 136a and 138a of inner race 134a. It will be understood that various other configurations of sleeve 220, insert 218, shaft 150a, and bearing 130a may be possible. For example, some embodiments may include a sleeve (e.g., similar to the sleeve 220), but not an insert, and some embodiments may include an insert (e.g., similar to the insert 218), but not a sleeve.

Figure 19:
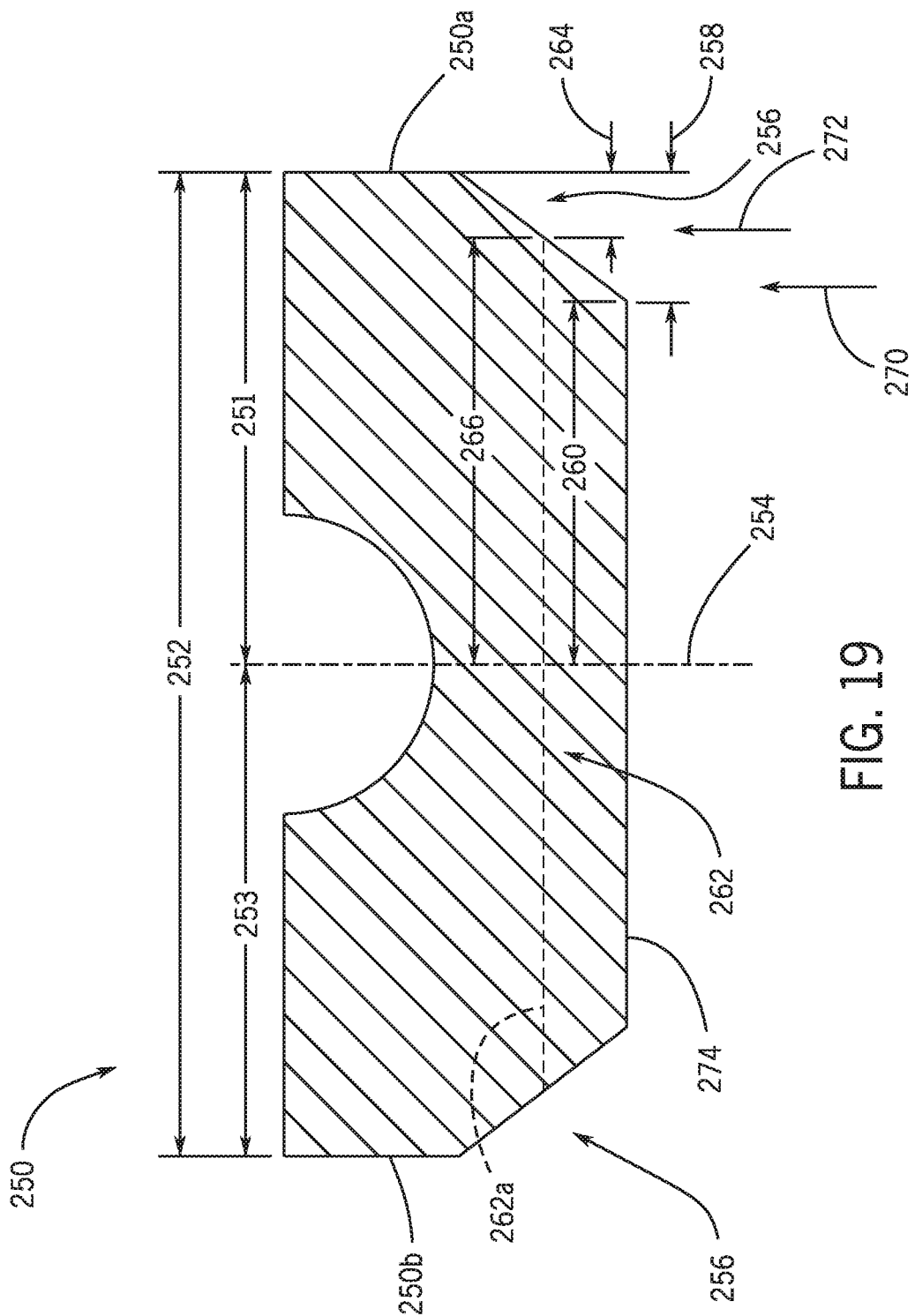
FIG. 19 is a schematic sectional view of an example inner race with a chamfer.

As also discussed above, it may be useful to configure a bearing or shaft such that an effective line of action from a relative deflection intersects the bearing at an axially outermost location that is 5% or more (at least 5%) of the total width of the relevant bearing feature (e.g., the relevant inner race), as measured from an axially outer edge of the bearing. As one illustration, referring also to FIG. 19, an example inner race 250 of a bearing exhibits a total width 252 between opposite axial ends 250a and 250b of the inner race 250. In some embodiments, the inner race 250 is generally symmetrical about a ball-path centerline 254. In other embodiments, the inner race 250 is non-symmetrical, with the ball-path centerline 254 not being centered between the axial edges 250a and 250b. When the inner race 250 is non-symmetrical, the distance 251 between ball-path centerline 254 and the one end 250a can be either less than or greater than the distance 253 between ball-path centerline 254 and the other end 250b. A chamfer 256 may be provided at either end 250a or 250b, or at both ends, of the inner race 250 such that an axially inner end of the chamfer 256 provides an axially outermost location for an effective line of action 270 for a relatively deflected shaft. Usefully, the chamfer 256 may exhibit an axial width 258, as measured from the outer edge 250a of the inner race 250, that is 5% or more of the total width 252 of the inner race 250. Alternatively, this may be viewed as a distance 260 between the axially inner end of the chamfer 256 and the ball-path centerline 254.

In some embodiments, the chamfer 256 may intersect certain other geometry of the inner race 250, such as one or more indents or recesses 262, resulting in the axially outermost location for an effective line of action 272 of a relatively deflected shaft being at a different location. For example, one or more indents or recesses 262 may be provided around an inner circumference of the inner race 250, as may be useful to accommodate a hexagonal or other non-circular shaft, including a shaft having a keyway in which the recess 262 forms a portion of the keyway. As depicted, a recess 262, which may be v-shaped, is provided that extends into the inner race 250 to an inner vertex 262a, such that the chamfer 256 intersects the recess 262, at the vertex 262a, at a distance 264 from the outer edge 250a of the inner race 250. Accordingly, due to the intersection of the chamfer 256 with the recess 262, the axially outermost location for an effective line of action 272 of a relatively deflected shaft may fall at the distance 264 from the outer edge 250a. Usefully, the chamfer 256 may be configured, with respect to the recess 262, such that the distance 264 is 5% or more of the total width 252 of the inner race 250. Alternatively, this may be viewed as a distance 266, as measured between the ball-path centerline 254 and the intersection of the chamfer 256 with the recess 262. In some embodiments, the inner race 25 may also include a crowned portion or region 274. When there is more than one indent or recess 262, the recesses 262 and the crowned region 274 may alternate around the inner circumference of the inner race 250 in either a symmetrical or asymmetrical arrangement. If the load from the relatively deflected shaft is positioned with a recess 262, then the axially outermost location for an effective line of action 272 may fall at the distance 264 from the outer edge 250a. If the load from the relatively deflected shaft is positioned on a crowned portion or region 274, then the axially outermost location for an effective line of action 270 may fall at the distance 258 from the outer edge 250a.

Whether the inner race 250 is symmetrical or non-symmetrical, it may be useful to configure the chamfer 256 such that the distance 258 is 5% or more of the width 252. When the inner race 250 includes one or more recesses 262, whether the inner race 250 is symmetrical or non-symmetrical, it may be useful to configure the chamfer 256 and the recess 262 such that the distance 264 is 5% or more of the width 252.

In some embodiments, non-spherical rolling elements (e.g., barrel-shaped rollers) can be used. In some embodiments, bearings with multiple rows of rolling elements can be used. In either case, similar considerations to those discussed above may apply.

As noted above, it will also be understood that various combinations of and variations on the specific embodiments described herein may be possible. For example, various combinations of stepped regions, crowned regions, recesses or indents, crowned raised regions, cornered raised regions, and so on may be utilized on one or both of an inner race and an associated shaft. Further, it will be understood that the disclosed configurations may be utilized with a variety of bearing types and a variety of shaft geometries, including round, polygonal (e.g., hexagonal), splined, or other shafts.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. An assembly for rotating machinery, the assembly comprising:
    a non-circular shaft having a shaft body, an outer shaft surface with an interior portion, and a nominal axis of relative rotation; and
    a bearing with an inner race engaging the shaft, the inner race including a race body at least partly defining a non-circular bore with axial edges and an inner race surface, the inner race surface having an interior portion and exterior portions each disposed axially between the interior portion and one of the axial edges of the race body, each exterior portion of the inner race surface being separated from the interior portion of the inner race surface by a race slope transition location spaced axially inward from one of the axial edges of the race body;
    wherein the race slope transition location defines a radial step such that the interior portion of the inner race surface, at least in part, extends radially farther away from the race body than the exterior portion of the inner race surface;
    wherein the inner race surface is radially spaced apart from the outer shaft surface axially outward from of the race slope transition location; and
    wherein the interior portion of the inner race surface, at least in part, contacts the interior portion of the outer shaft surface such that, when the shaft body is deflected from the nominal axis of relative rotation with respect to the bearing, the shaft body applies a force to the bearing at an axially outermost location that is axially inward of the axial edges of the race body.

2. The assembly of claim 1, wherein the interior portion of the inner race surface, at least in part, extends radially farther away from the race body than a radial surface of the race slope transition location.

3. The assembly of claim 1, wherein the outer shaft surface has exterior portions each disposed axially outside of the interior portion of the outer shaft surface and separated from the interior portion of the outer shaft surface by a shaft slope transition location.

4. The assembly of claim 3, wherein the interior portion of the outer shaft surface, at least in part, extends radially farther away from the nominal axis of rotation than a radial surface at the shaft slope transition location.

5. The assembly of claim 1, wherein the interior portion of the outer shaft surface includes a plurality of flat regions and a plurality of raised regions, the flat regions being arranged alternately with the raised regions around the outer shaft surface.

6. The assembly of claim 5, wherein the raised regions are crowned regions.

7. The assembly of claim 6, wherein the flat regions are elliptical; and
    wherein the crowned regions include an hourglass-shaped portion bounded, at least in part, by the elliptical flat regions.

8. The assembly of claim 1, wherein the interior portion of the inner race surface includes a plurality of recesses and a plurality of raised regions, the recesses being arranged alternately with the raised regions around the race body.

9. The assembly of claim 8, wherein the recesses include flat sides; and
    wherein the raised regions include an hourglass-shaped portion.

10. The assembly of claim 1, wherein the interior portion of the inner race surface is included on an insert mounted to the race body.

11. The assembly of claim 1, wherein the interior portion of the outer shaft surface is included on a sleeve mounted to the shaft.

12. The assembly of claim 1, wherein the axially outermost location is disposed axially inward from one of the axial edges of the race body by at least 5% of a total distance between the axial edges of the race body.

* * * * *